United States Patent
Meo et al.

(10) Patent No.: US 12,169,305 B2
(45) Date of Patent: Dec. 17, 2024

(54) FUSION SPLICING DEVICE AND FUSION SPLICING METHOD

(71) Applicant: SUMITOMO ELECTRIC OPTIFRONTIER CO., LTD., Yokohama (JP)

(72) Inventors: Ryosuke Meo, Yokohama (JP); Hiroshi Takayanagi, Yokohama (JP); Shohei Nakamura, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 621 days.

(21) Appl. No.: 17/424,029

(22) PCT Filed: Dec. 23, 2019

(86) PCT No.: PCT/JP2019/050417
§ 371 (c)(1),
(2) Date: Jul. 19, 2021

(87) PCT Pub. No.: WO2020/162064
PCT Pub. Date: Aug. 13, 2020

(65) Prior Publication Data
US 2022/0099894 A1    Mar. 31, 2022

(30) Foreign Application Priority Data
Feb. 5, 2019 (JP) .................. 2019-018759

(51) Int. Cl.
*G02B 6/255* (2006.01)

(52) U.S. Cl.
CPC .................. *G02B 6/2553* (2013.01)

(58) Field of Classification Search
None
See application file for complete search history.

(56) References Cited

U.S. PATENT DOCUMENTS 3,928,102 A * 12/1975 Rowe .................. G02B 6/3803
156/304.6
4,102,717 A * 7/1978 Hensel ................. G02B 6/3803
156/379
(Continued)

FOREIGN PATENT DOCUMENTS

JP    S56-078812 A    6/1981
JP    H07-318742 A    12/1995
(Continued)

*Primary Examiner* — Thor S Campbell
(74) *Attorney, Agent, or Firm* — Oliff PLC

(57) ABSTRACT

A fusion splicer includes a first electrode, a second electrode, an optical fiber disposition unit, and a first conductive member. The first electrode has a first potential, the second electrode has a second potential lower than the first potential, and an arc discharge is generated therebetween. The optical fiber disposition unit has grooves in which first optical fibers and second optical fibers are accommodated. The first conductive member is provided apart from the grooves between the first electrode and the second electrode. The first conductive member has a third potential that is lower than the first potential and higher than the second potential, and is disposed at a position at which the shortest distance from one of the first electrode and the second electrode is shorter than the shortest distance from the other of the first electrode and the second electrode.

20 Claims, 20 Drawing Sheets

(56) References Cited

U.S. PATENT DOCUMENTS

| | | | | | |
|---|---|---|---|---|---|
| 4,372,768 | A | * | 2/1983 | Zucker | G02B 6/2551 65/378 |
| 4,604,119 | A | * | 8/1986 | Kuhl | G02B 6/2551 65/422 |
| 4,695,306 | A | * | 9/1987 | Hakoun | G02B 6/2551 65/378 |
| 4,812,010 | A | * | 3/1989 | Osaka | G02B 6/566 385/98 |
| 4,878,933 | A | * | 11/1989 | Yamada | G02B 6/3805 65/378 |
| 4,986,843 | A | * | 1/1991 | Itoh | G02B 6/2551 356/153 |
| 5,149,350 | A | * | 9/1992 | Itoh | G02B 6/3805 356/73.1 |
| 5,158,591 | A | * | 10/1992 | Onodera | G02B 6/2551 65/158 |
| 5,766,300 | A | * | 6/1998 | Hulten | G02B 6/2551 29/466 |
| 6,336,750 | B1 | * | 1/2002 | Clark | G02B 6/2551 219/121.13 |
| 7,680,384 | B2 | * | 3/2010 | Billman | G01M 11/33 385/136 |
| 8,094,988 | B2 | * | 1/2012 | Billman | G02B 6/3802 385/147 |
| 2001/0041035 | A1 | * | 11/2001 | Uchida | G02B 6/2555 219/121.37 |
| 2003/0007755 | A1 | * | 1/2003 | Morita | G02B 6/2551 385/96 |
| 2004/0190838 | A1 | * | 9/2004 | Bush | G02B 6/2555 385/96 |
| 2005/0041938 | A1 | | 2/2005 | Hattori et al. | |
| 2005/0276549 | A1 | * | 12/2005 | Tabata | G02B 6/2551 385/96 |
| 2005/0276550 | A1 | * | 12/2005 | Kanda | G02B 6/2551 385/97 |
| 2007/0031098 | A1 | * | 2/2007 | Wiley | G02B 6/245 385/134 |
| 2014/0131326 | A1 | * | 5/2014 | Sato | G02B 6/2557 219/121.58 |
| 2016/0116675 | A1 | * | 4/2016 | Sasaki | G02B 6/2553 65/485 |
| 2018/0081120 | A1 | * | 3/2018 | Akiyama | G02B 6/2551 |
| 2022/0099894 | A1 | * | 3/2022 | Meo | G02B 6/2551 |
| 2024/0142703 | A1 | * | 5/2024 | Hasegawa | G02B 6/2553 |

FOREIGN PATENT DOCUMENTS

| | | | | |
|---|---|---|---|---|
| JP | 2002-014252 | A | | 1/2002 |
| JP | 2003-029077 | A | | 1/2003 |
| JP | 2003021744 | A | * | 1/2003 ........... G02B 6/2551 |
| JP | 2004-029228 | A | | 1/2004 |
| JP | 2004-085782 | A | | 3/2004 |
| JP | 2005-010769 | A | | 1/2005 |

* cited by examiner

FUSION SPLICING DEVICE AND FUSION SPLICING METHOD

TECHNICAL FIELD

The present disclosure relates to a fusion splicer and a method for fusion-splicing. The present application claims the benefit of the priority based on Japanese Patent Application No. 2019-018759, filed Feb. 5, 2019, the entire content disclosed in the application is incorporated herein by reference.

BACKGROUND ART

Patent Literature 1 and Patent Literature 2 disclose a fusion splicer for multi-fiber optical fiber cables. An object of these devices is to make the amounts of heat applied to all fibers almost uniform when multi-fiber optical fiber cables are thermally fused. In these devices, fibers of multi-fiber optical fiber cables to be spliced are confronted on a fiber installation stand having V grooves, and fusion-spliced by a pair of discharge electrodes. The device described in Patent Literature 1 includes a potential applying unit that also serves as a conductor fiber clamp that is installed to straddle between a pair of discharge electrodes, and it is intended to make the amounts of heat applied to all fibers almost uniform by adjusting a discharge path by the potential applying unit. The device described in Patent Literature 2 includes a potential applying unit composed of a conductor plate under a fiber holder, and it is intended to make the amounts of heat applied to all fibers almost uniform by adjusting and controlling a discharge path by the potential applying unit.

CITATION LIST

Patent Literature

[Patent Literature 1] Japanese Unexamined Patent Publication No. 2003-021744
[Patent Literature 2] Japanese Unexamined Patent Publication No, 2003-029077

SUMMARY OF INVENTION

The present disclosure provides a fusion splicer. The fusion splicer is configured to fusion-splice end surfaces of a plurality of first optical fibers and end surfaces of a plurality of second optical fibers by melting with an arc discharge. The fusion splicer includes a first electrode, a second electrode, an optical fiber disposition unit, and a first conductive member. The first electrode and the second electrode each have a distal end and are disposed so that the distal ends face each other on a center line that extends in a first direction. The first electrode has a first potential and the second electrode has a second potential lower than the first potential, and the first electrode and the second electrode are configured to generate an arc discharge between distal ends. The optical fiber disposition unit has a plurality of grooves in which the plurality of first optical fibers and the plurality of second optical fibers are able to be accommodated and which extend in a second direction intersecting the first direction, and is disposed between the first electrode and the second electrode in the first direction. The first conductive member is provided apart from the plurality of grooves between the first electrode and the second electrode in the first direction. The first conductive member has a third potential that is lower than the first potential and higher than the second potential, and is disposed at a position at which the shortest distance from the one of the first electrode and the second electrode is shorter than the shortest distance from the other of the first electrode and the second electrode in the first direction.

The present disclosure provides a method for fusion-splicing. The method for fusion-splicing is a method for fusion-splicing end surfaces of a plurality of first optical fibers and end surfaces of a plurality of second optical fibers using the above fusion splicer. The method for fusion splicing includes disposing the plurality of first optical fibers in the plurality of grooves corresponding to the plurality of first optical fibers; disposing the plurality of second optical fibers in the plurality of grooves corresponding to the plurality of second optical fibers; facing the end surfaces of the plurality of first optical fibers and the end surfaces of the plurality of second optical fibers each other in an area between the distal end of the first electrode and the distal end of the second electrode; and generating an arc discharge between the first electrode and the second electrode to fusion-splice the end surfaces of the plurality of first optical fibers and the end surfaces of the plurality of second optical fibers by melting, in the fusion-splicing; the third potential that is lower than the first potential and higher than the second potential is supplied to at least one of the first conductive member and the second conductive member.

The present disclosure also provides a method for fusion-splicing. The method for fusion-splicing is a method for fusion-splicing end surfaces of a plurality of first optical fibers and end surfaces of a plurality of second optical fibers. In the method for fusion-splicing, a pair of electrodes to generate an arc discharge, an optical fiber disposition unit which is disposed in an area between the pair of electrodes in a first direction along a center line connecting distal ends of the pair of electrodes and which has a plurality of grooves which are arranged in the first direction and in which the plurality of first optical fibers and the plurality of second optical fibers are able to be accommodated, and one or more conductive members that are provided apart from the plurality of first optical fibers and the plurality of second optical fibers in the area are used. An arc discharge is generated between the pair of electrodes with a first potential for one of the pair of electrodes and a second potential lower than the first potential for the other of the pair of electrodes. The one or more conductive members which have a third potential that is lower than the first potential and higher than the second potential are disposed at a position at which the shortest distance from one of the pair of electrodes is shorter than the shortest distance from the other of the pair of electrodes in the first direction.

MODE FOR CARRYING OUT THE INVENTION

Figure 1:
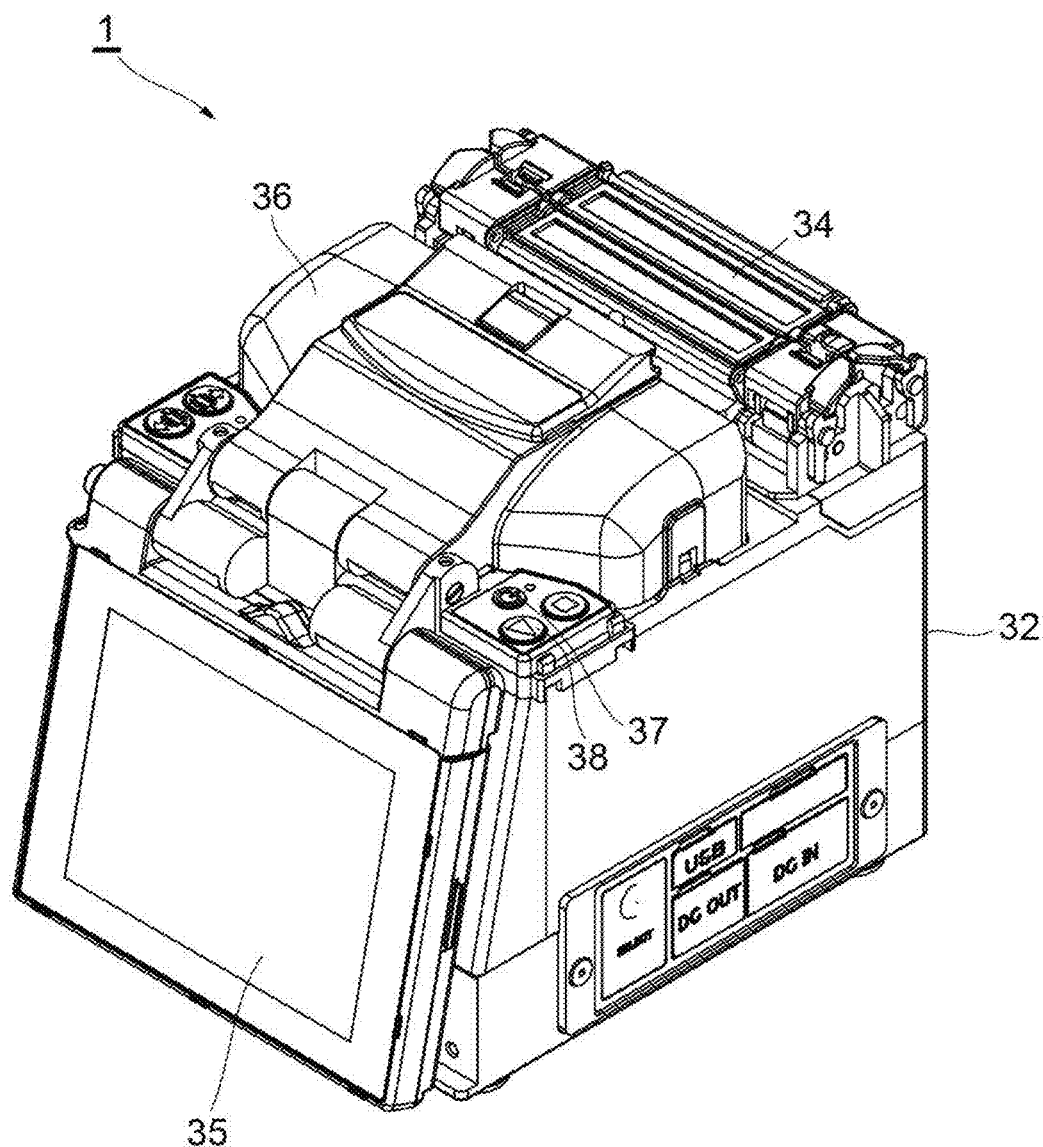
FIG. 1 is a perspective view illustrating an appearance of a fusion splicer according to an embodiment.

Problems to be Solved by the Present Disclosure

For example, as shown in Patent Literature 1 and Patent Literature 2, when multi-fiber optical fiber cables are fusion-spliced each other, a pair of electrodes are disposed at both ends in the arrangement direction of the multi-fiber optical fiber cables, an arc discharge is generated between the pair of electrodes. Thus, the multi-fiber optical fiber cables are melted and collectively fusion-spliced. In such a fusion-splicing method of multi-fiber optical fiber cables, the molten state of optical fibers may vary depending on the position in the arrangement direction. For example, the melting amount of optical fibers near the electrode may be larger than the melting amount of optical fibers far from the electrode. Therefore, an object of the present disclosure is to provide a fusion splicer and a method for fusion-splicing through which it is possible to reduce the variation in the molten state according to the arrangement direction position of multi-fiber optical fiber cables.

Advantageous Effects of the Present Disclosure

According to the present disclosure, it is possible to reduce the variation in the fused state according to the arrangement direction position of multi-fiber optical fiber cables in fusion-splicing multi-fiber optical fiber cables each other.

DESCRIPTION OF EMBODIMENTS OF THE PRESENT DISCLOSURE

First, embodiments of the present disclosure will be listed and described. A fusion splicer according to an embodiment is a fusion splicer configured to fusion-splice end surfaces of a plurality of first optical fibers and end surfaces of a plurality of second optical fibers by melting with an arc discharge. The fusion splicer includes a first electrode, a second electrode, an optical fiber disposition unit, and a first conductive member. The first electrode and the second electrode each have a distal end and are disposed so that the distal ends face each other on a center line that extends in a first direction. The first electrode has a first potential and the second electrode has a second potential lower than the first potential, and the first electrode and the second electrode are configured to generate an arc discharge between distal ends. The optical fiber disposition unit has a plurality of grooves in which the plurality of first optical fibers and the plurality of second optical fibers can be accommodated and which extend in a second direction intersecting the first direction, and is disposed between the first electrode and the second electrode in the first direction. The first conductive member is provided apart from the plurality of grooves between the first electrode and the second electrode in the first direction. The first conductive member has a third potential that is lower than the first potential and higher than the second potential, and is disposed at a position at which the shortest distance from one of the first electrode and the second electrode is shorter than the shortest distance from the other of the first electrode and the second electrode in the first direction.

A method for fusion-splicing according to an embodiment is a method for fusion-splicing end surfaces of a plurality of first optical fibers and end surfaces of a plurality of second optical fibers. In the method for fusion-splicing, a pair of electrodes to generate an arc discharge, an optical fiber disposition unit which is disposed in an area between the pair of electrodes in a first direction along a center line connecting distal ends of the pair of electrodes and which has a plurality of grooves which are arranged in the first direction and in which the plurality of first optical fibers and the plurality of second optical fibers are accommodated, and one or more conductive members that are provided apart from the plurality of first optical fibers and the plurality of second optical fibers in the area, are used. An arc discharge is generated between the pair of electrodes with a first potential for one of the pair of electrodes and a second potential lower than the first potential for the other of the pair of electrodes. The one or more conductive members which have a third potential that is lower than the first potential and higher than the second potential are disposed at a position at which the shortest distance from one of the pair of electrodes is shorter than the shortest distance from the other of the pair of electrodes in the first direction.

In the fusion splicer and the method for fusion-splicing, a first conductive member having a third potential that is lower than the first potential and higher than the second potential is provided apart from the plurality of pairs of optical fibers in an area between the pair of electrodes in a direction along a center line connecting distal ends of the pair of electrodes. In this case, an arc (electric arc) of the arc discharge generated between the pair of electrodes is attracted to the first conductive member. Thus, the shape of the arc can be adjusted, and the molten state of the optical fibers can be made substantially uniform. According to the fusion splicer and the method for fusion-splicing, it is possible to reduce the variation in the fused state according to the arrangement direction position of the multi-fiber optical fiber cables in the fusion-splicing the multi-fiber optical fiber cables.

As an embodiment, the first conductive member may be disposed at a position at which the shortest distance from the first electrode is shorter than the shortest distance from the second electrode in the first direction. In this case, an arc of the arc discharge generated between the pair of electrodes can be strongly attracted to the first conductive member, and the molten state of the optical fibers can be made more uniform.

As an embodiment, the third potential may be an average potential of the first potential and the second potential. In this case, the shape of the arc can be adjusted more appropriately, and the molten state of the optical fibers can be made more uniform.

As an embodiment, the plurality of grooves and the first conductive member may at least partially overlap when viewed in a third direction orthogonal to both the first direction and the second direction. In this case, an area occupied by the plurality of first optical fibers and the like and the first conductive member overlap, the shape of the arc can be adjusted more appropriately, and thus, the molten state of the optical fibers can be made more uniform.

As an embodiment, the fusion splicer may further include a conductive and columnar first support member that extends in a third direction intersecting both the first direction and the second direction and supports the first conductive member. The first conductive member may have a plate shape in the first direction as a thickness direction and extend from a distal end part of the first support member. A base end of the first support member may be electrically connected to a constant potential line having the third potential. In this manner, when the first conductive member has a plate shape in the first direction as a thickness direction, the shape of the arc can be adjusted more appropriately, and the molten state of the optical fibers can be made more uniform. In addition, for example, when the above support member is provided, only the plate-like conductive member can be made closer to the arc. In this embodiment, the thickness of the first conductive member in the first direction may be thinner than the thickness of the first support member in the first direction. The thickness of the first conductive member may be 0.5 mm or more and 4.0 mm or less. The first conductive member and the first support member may be continuously formed as an integrated object.

As an embodiment, the fusion splicer may further include a main body on which the first electrode and the second electrode, and the optical fiber disposition unit are mounted. A first holding hole positioned between the first electrode and the second electrode in the first direction may be provided in the main body, and at least a part of the first conductive member and the first support member may be inserted into and held in the first holding hole. In this case, the position of the first conductive member or the like can be kept at a predetermined position for a long period.

As an embodiment, the fusion splicer may further include a second conductive member that is provided apart from the plurality of grooves between the first electrode and the second electrode in the first direction. The second conductive member may have a third potential that is lower than the first potential and higher than the second potential, and may be disposed at a position at which the shortest distance from one of the first electrode and the second electrode is shorter than the shortest distance from the other of the first electrode and the second electrode in the first direction. In this case, the shape of the arc can be adjusted more appropriately, and the molten state of the optical fibers can be made more uniform. In this embodiment, the first conductive member and the second conductive member may be disposed to face each other in a second direction intersecting the first direction, and a distance between the first conductive member and the center line and a distance between the second conductive member and the center line may be equal to each other.

As an embodiment, the fusion splicer may further include a conductive and columnar second support member that extends in a third direction intersecting both the first direction and the second direction and supports the second conductive member. The second conductive member may have a plate shape in the first direction as a thickness direction and extend from a distal end part of the second support member. A base end of the second support member may be electrically connected to a constant potential line having the third potential. In this manner, when the second conductive member has a plate shape in the first direction as a thickness direction, the shape of the arc can be adjusted more appropriately, and the molten state of the optical fibers can be made more uniform. In addition, for example, when the above support member is provided, only the plate-like conductive member can be made closer to the arc. In this embodiment, the thickness of the second conductive member in the first direction may be thinner than the thickness of the second support member in the first direction. The thickness of the second conductive member may be 0.5 mm or more and 4.0 mm or less. The second conductive member and the second support member may be continuously formed as an integrated object.

A method for fusion-splicing according to another embodiment is a method for fusion-splicing end surfaces of a plurality of first optical fibers and end surfaces of a plurality of second optical fibers using the fusion splicer according to any of the above embodiments. The method for fusion-splicing includes disposing the plurality of first optical fibers in the plurality of grooves corresponding to the plurality of first optical fibers; disposing the plurality of second optical fibers in the plurality of grooves corresponding to the plurality of second optical fibers; facing the end surfaces of the plurality of first optical fibers and the end surfaces of the plurality of second optical fibers each other in an area between the distal end of the first electrode and the distal end of the second electrode; and generating an arc discharge between the first electrode and the second electrode to fusion-splice the end surfaces of the plurality of first optical fibers and the end surfaces of the plurality of second optical fibers by melting. In the fusion-splicing, the third potential that is lower than the first potential and higher than the second potential is supplied to at least one of the first conductive member and the second conductive member. According to the method for fusion-splicing, as described in each embodiment of the fusion splicer, in fusion-splicing the multi-fiber optical fiber cables, it is possible to reduce the variation in the fused state according to the arrangement direction position of the multi-fiber optical fiber cables. In the method for fusion-splicing, at least one of the disposing of the plurality of first optical fibers and the disposing of the plurality of second optical fibers, and the facing may be performed at the same time.

Details of Embodiments of the Present Disclosure

Specific examples of a fusion splicer and a method for fusion-splicing of the present disclosure will be described below with reference to the drawings. The present invention is not limited to these examples, and is indicated by the scope of the claims and is intended to include meanings equivalent to the scope of the claims and all modifications within the scope of the claims. In the following description, the same components in descriptions of the drawings are denoted with the same reference numerals, and redundant descriptions will be omitted. In the description, the XYZ orthogonal coordinate system shown in the drawings may be referred to. In addition, in the following description, the X direction corresponds to the first direction in the present disclosure.

FIG. 1 is a perspective view showing an appearance of a fusion splicer 1 according to the present embodiment. The fusion splicer 1 is a device configured to fusion-splice a plurality of pairs of optical fibers (glass fibers) arranged so that end surfaces are abutted against each other by melting with an arc discharge. For example, the fusion splicer 1 fusion-splices ends of a plurality of optical fibers constituting a multi-fiber optical fiber cable and ends of a plurality of optical fibers constituting another multi-fiber optical fiber cable with each other.

As shown in FIG. 1, the fusion splicer 1 includes a box-shaped housing 32. A fusion splicing unit (to be described below) for fusing optical fibers to each other and a heater 34 are provided above the housing 32. The heater 34 heats and contracts a fiber reinforced sleeve that covers the fused part of the optical fibers. The fusion splicer 1 further includes a monitor 35, a windshield cover 36, a power switch 37, and a connection start switch 38. The monitor 35 displays the status of the fusion-spliced optical fibers captured by a camera (not shown) disposed inside the housing 32. The windshield cover 36 prevents air from entering in the fusion splicing unit. The power switch 37 is a push button for switching the power source of the fusion splicer 1 on/off according to an operation of a user. The connection start switch 38 is a push button for starting an operation for fusing optical fibers to each other according to an operation of the user.

Figure 2:
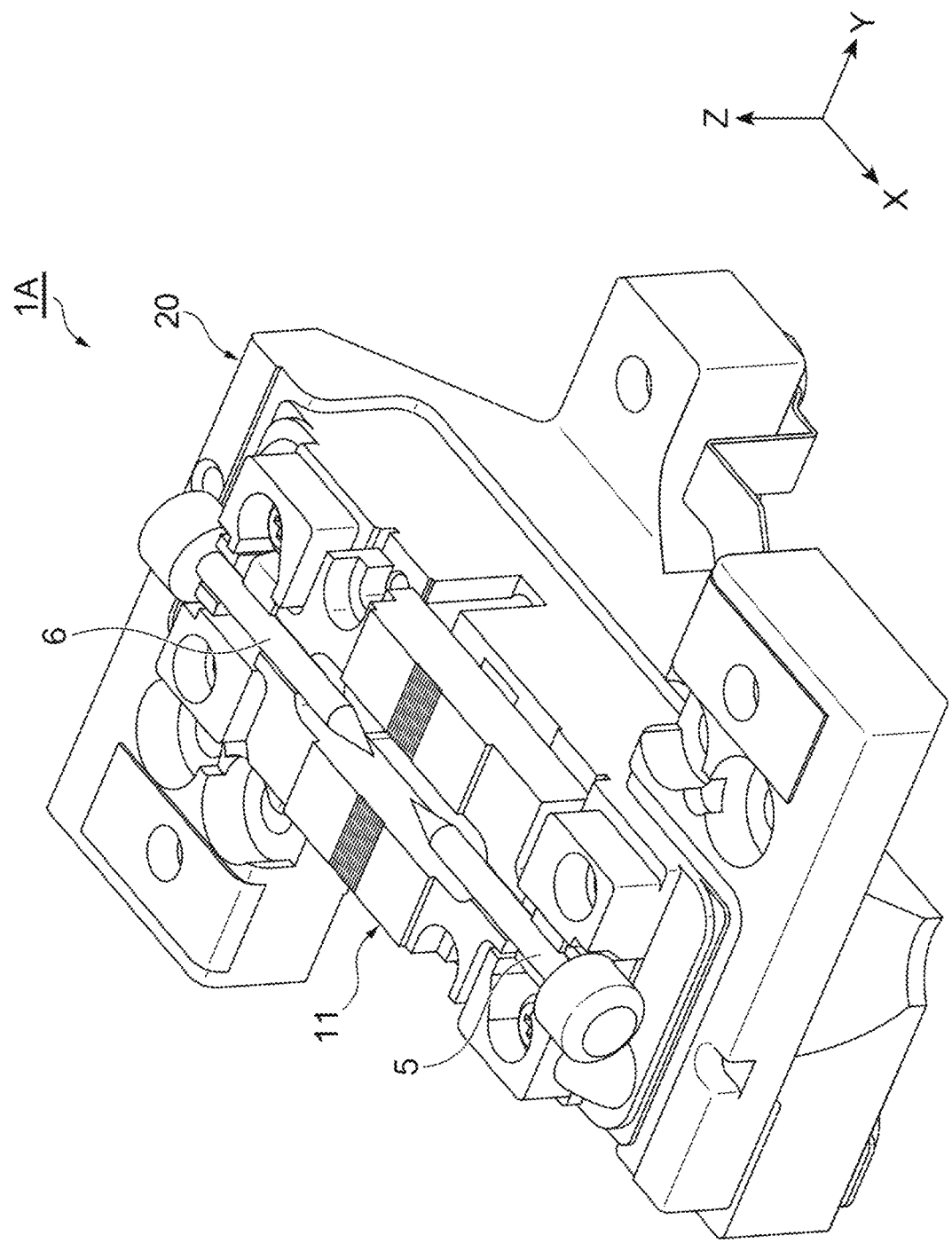
FIG. 2 is an enlarged perspective view illustrating a fusion splicing unit included in the fusion splicer.

FIG. 2 is an enlarged perspective view showing a fusion splicing unit 1A included in the fusion splicer 1. As shown in FIG. 2, the fusion splicing unit 1A further includes a support 20 in addition to a pair of electrodes 5 and 6 and a pedestal 11 described above. The pedestal 11 is mounted on the support 20, and the pair of electrodes 5 and 6 are disposed on the pedestal 11.

Figure 3:
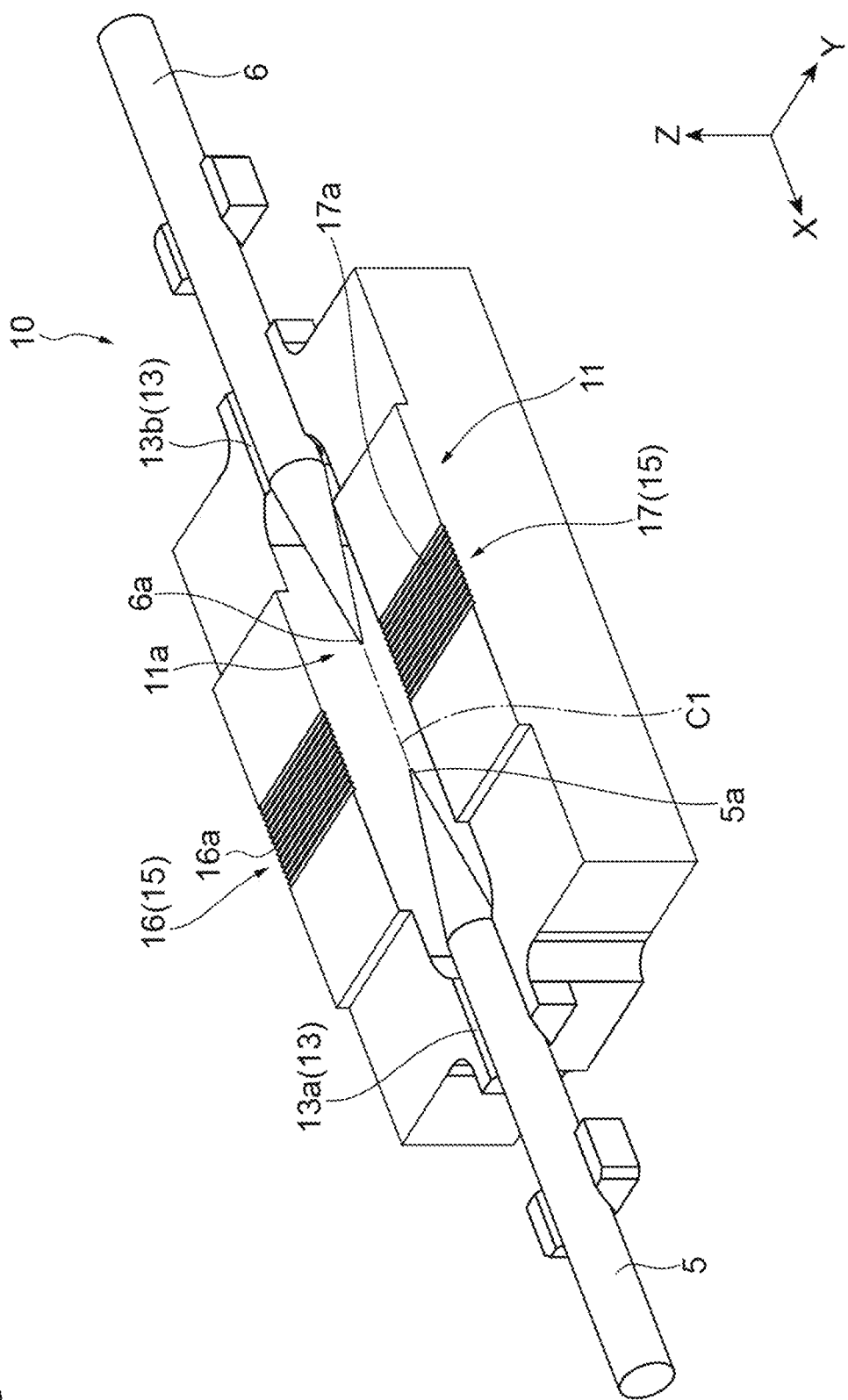
FIG. 3 is an enlarged perspective view illustrating a pair of electrodes and a pedestal.

FIG. 3 is an enlarged perspective view showing the pair of electrodes 5 and 6 and the pedestal 11. As shown in FIG. 3, the pair of electrodes 5 and 6 are disposed apart from each other on the pedestal 11. A distal end 5a of the electrode 5 and a distal end 6a of the electrode 6 face each other. In the shown example, the electrodes 5 and 6 have a substantially conical part whose diameter decreases toward the distal ends 5a and 6a.

The pedestal 11 includes an electrode disposition unit 13 and an optical fiber disposition unit 15. As an example, the material of the pedestal 11 may be zirconia. The electrode disposition unit 13 is a part in which the pair of electrodes 5 and 6 are disposed. The electrode disposition unit 13 has contact surfaces 13a and 13b corresponding to the pair of electrodes 5 and 6. The contact surfaces 13a and 13b are formed with two planes in a substantially V-shaped cross section. When the electrode 5 comes into contact with the contact surface 13a, the positions of the electrode 5 in the Y direction and the Z direction are determined. When the electrode 6 comes into contact with the contact surface 13b, the positions of the electrode 6 in the Y direction and the Z direction are determined. The positions of the electrodes 5 and 6 in the X direction can be adjusted when the electrodes 5 and 6 are in contact with the contact surfaces 13a and 13b. The positioned electrodes 5 and 6 can be fixed to the electrode disposition unit 13 with a fixing member (not shown). In addition, the pedestal 11 has an opening 11a. The opening 11a penetrates through the pedestal 11 in the Z direction in an area between the contact surface 13a and the contact surface 13b in the X direction. The distal ends 5a and 6a of the pair of electrodes 5 and 6 face each other in the opening 11a.

The optical fiber disposition unit 15 is positioned between the pair of electrodes 5 and 6 in the X direction. The optical fiber disposition unit 15 includes a first disposition unit 16 and a second disposition unit 17. In the Y direction, the first disposition unit 16 is positioned on one side of a center line C1 connecting the distal ends 5a and 6a of the pair of electrodes 5 and 6. The second disposition unit 17 is positioned on the other side of the center line C1. That is, the first disposition unit 16 and the second disposition unit 17 are separated from each other with the center line C1 therebetween in the Y direction. The first disposition unit 16 has a plurality of grooves 16a for accommodating and positioning each of a plurality of (12 in the shown example) optical fibers. The cross-sectional shape perpendicular to the extension direction of the grooves 16a is, for example, a V shape. The grooves 16a are disposed at equal intervals in the X direction and extend linearly in the Y direction. Similarly, the second disposition unit 17 has a plurality of grooves 17a for accommodating and positioning each of another plurality of (12 in the shown example) optical fibers. The cross-sectional shape perpendicular to the extension direction of the grooves 17a is, for example, a V shape. The grooves 17a are disposed at equal intervals in the X direction and extend linearly in the Y direction. The plurality of grooves 16a of the first disposition unit 16 and the plurality of grooves 17a of the second disposition unit 17 are positioned on a common straight line. Thereby, the optical fibers positioned by the grooves 16a of the first disposition unit 16 and the optical fibers positioned by the grooves 17a of the second disposition unit 17 are abutted against each other in the area between the first disposition unit 16 and the second disposition unit 17. The area between the first disposition unit 16 and the second disposition unit 17 is the opening 11a of the pedestal 11.

Figure 4:
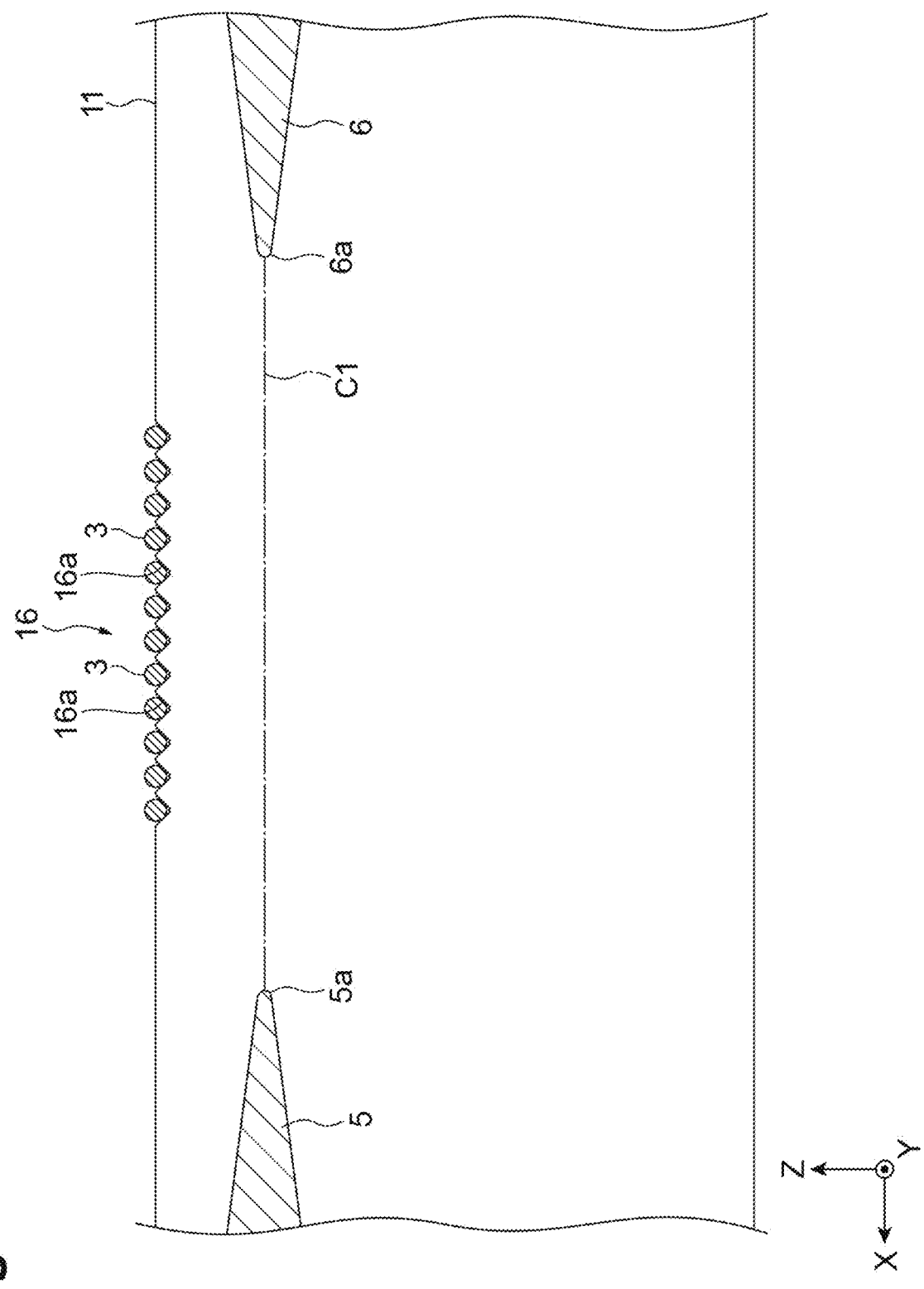
FIG. 4 is an enlarged side cross-sectional view illustrating the pair of electrodes and a first disposition unit of the pedestal.

FIG. 4 is an enlarged side cross-sectional view showing the pair of electrodes 5 and 6 and the first disposition unit 16 of the pedestal 11. FIG. 4 is a cross-sectional view when viewed from the side of the first disposition unit 16 along the XZ plane including the center line C1, and shows a plurality of optical fibers 3 together installed in the first disposition unit 16. Since the configuration in which a plurality of optical fibers are installed in the second disposition unit 17 is the same as the configuration in which a plurality of optical fibers 3 are installed in the first disposition unit 16, descriptions thereof will be omitted.

As shown in FIG. 4, the plurality of optical fibers 3 are positioned between the pair of electrodes 5 and 6 in the direction X, and are accommodated in the corresponding grooves 16a. The axial direction of the optical fibers 3 is aligned with the Y direction. The plurality of optical fibers 3 are disposed apart from each other in the X direction. The pitch between adjacent optical fibers 3 is uniform. As an example, the diameter of the optical fibers 3 is 125 μm, and the plurality of optical fibers 3 are arranged in the direction X with a pitch of 250 μm corresponding to twice the diameter. The positions at which the optical fibers 3 are arranged are shifted from the center line C1 of the electrodes 5 and 6 in the Y direction.

Figure 5:
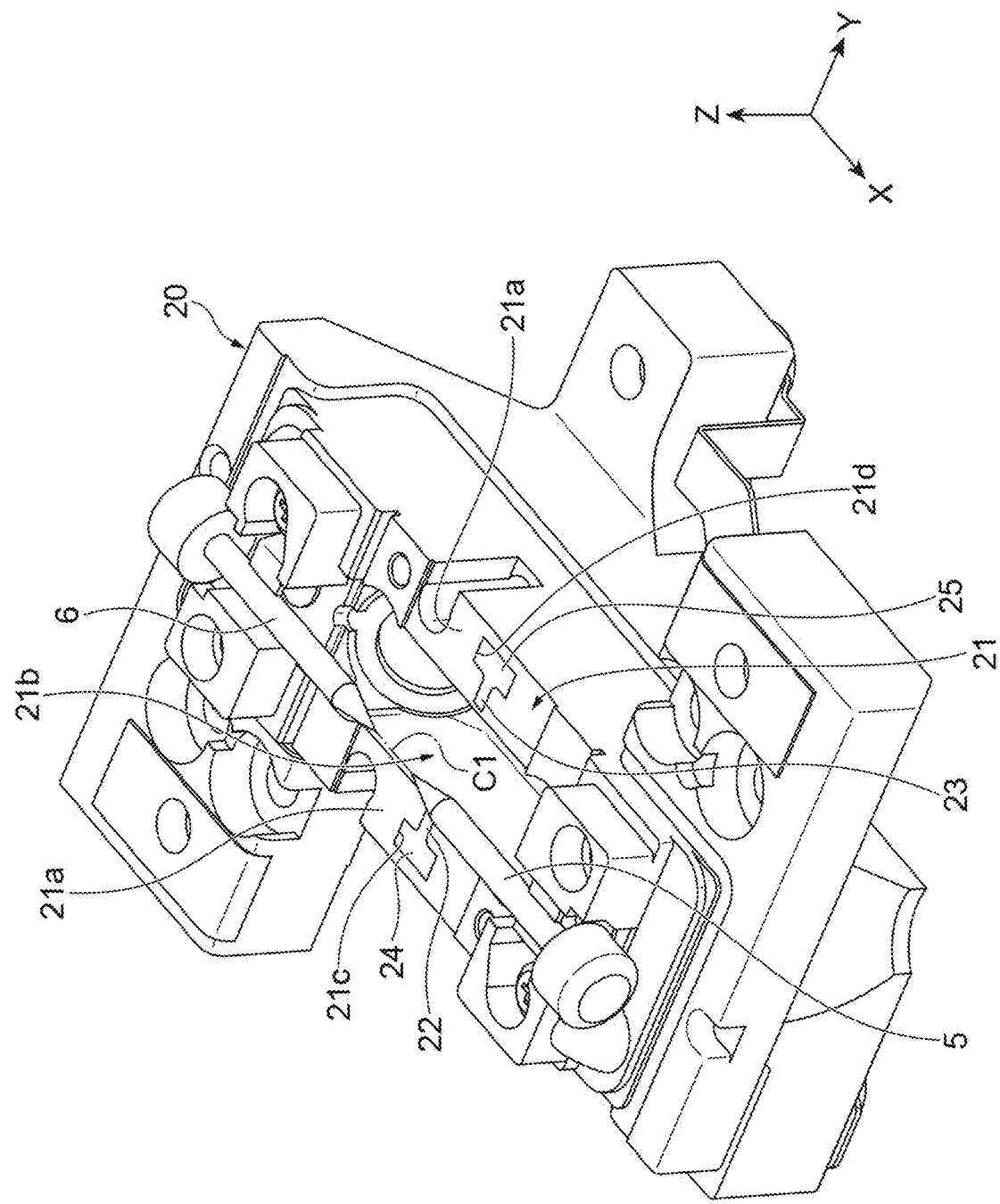
FIG. 5 is a perspective view illustrating a state in which the pedestal is removed in FIG. 2.

FIG. 5 is a perspective view showing a state in which the pedestal 11 is removed from FIG. 2. As shown in FIG. 5, the support 20 includes a main body 21 that supports the pedestal 11, a pair of conductive members 22 and 23 held by the main body 21, a support member 24 that supports the conductive member 22, and a support member 25 that supports the conductive member 23.

The main body 21 is, for example, a resin member. The main body 21 is disposed below the pedestal 11, and has a mounting surface 21a on which the pedestal 11 is mounted at a substantially central part in the X direction and the Y direction. An opening 21b that penetrates through the main body 21 in the Z direction is formed on the mounting surface 21a, and the opening 21b communicates with the opening 11a of the pedestal 11 described above in the Z direction. The distal ends 5a and 6a of the pair of electrodes 5 and 6 are positioned above the opening 21b in the Z direction. The main body 21 further has a holding hole 21c for holding the conductive member 22 and the support member 24, and a holding hole 21d for holding the conductive member 23 and the support member 25. The holding holes 21c and 21d are formed on both sides of the opening 21b in the Y direction, and penetrate through the main body 21 in the Z direction.

The pair of conductive members 22 and 23 are made of, for example, a conductive material such as a metal, and are disposed on both sides of the opening 21b in the Y direction. That is, in the Y direction, one conductive member 22 is disposed on one side of the opening 21b, and the other conductive member 23 is disposed on the other side of the opening 21b. The conductive member 22 and the support member 24 are fitted into the holding hole 21c formed in the main body 21 and thus held in the holding hole 21c. The conductive member 23 and the support member 25 are fitted into the holding hole 21d formed in the main body 21 and thus held in the holding hole 21d. The upper end surfaces of the conductive members 22 and 23 and the upper end surfaces of the support members 24 and 25 are flush with the mounting surface 21a, and exposed from the mounting surface 21a. Thus, the conductive members 22 and 23 and the plurality of pairs of optical fibers 3 are separated from each other by a distance defined by the thickness of the pedestal 11 in the Z direction.

Figure 6:
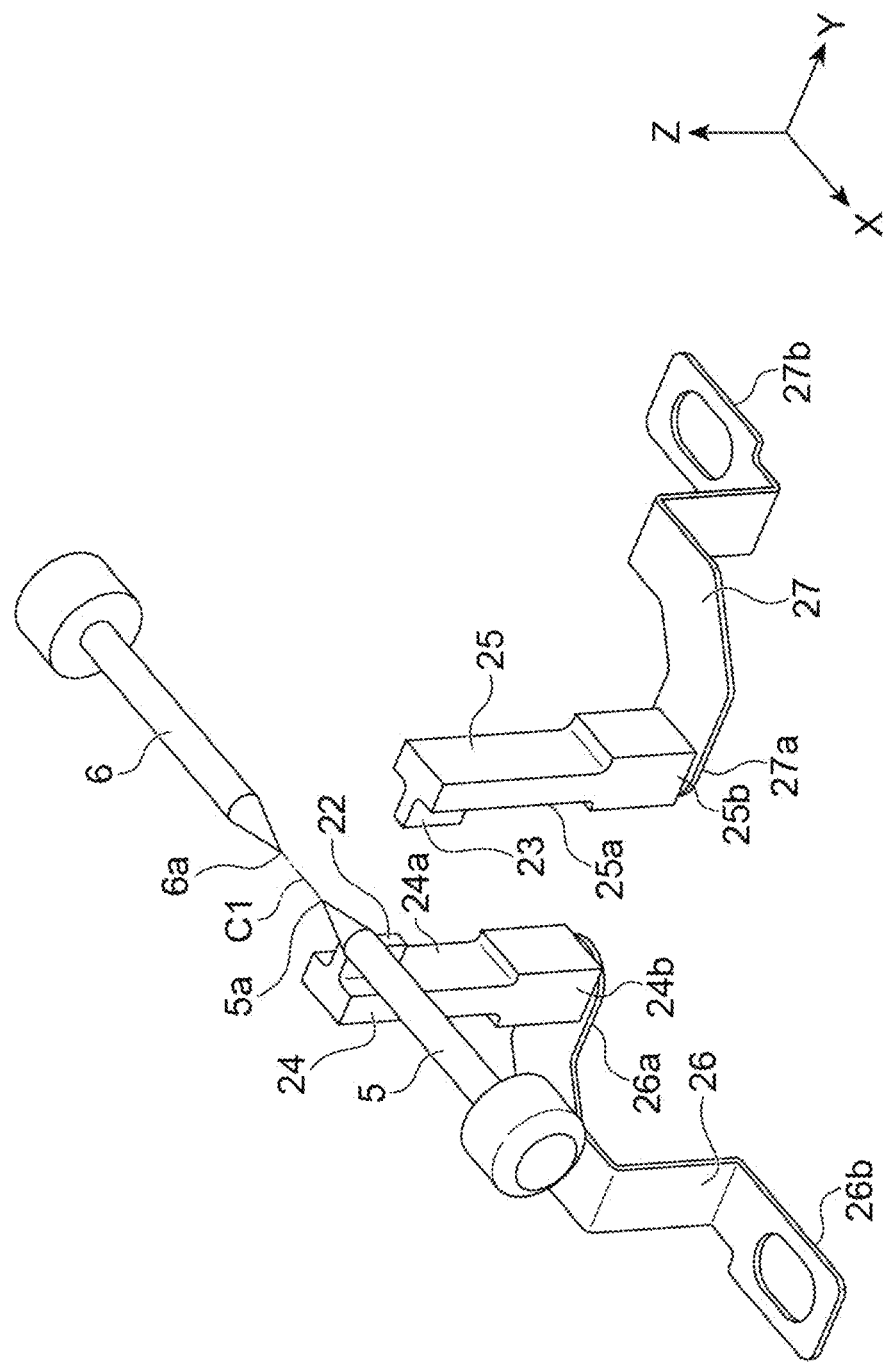
FIG. 6 is a perspective view illustrating the pair of electrodes, a pair of conductive members, and a support member.
Figure 7:
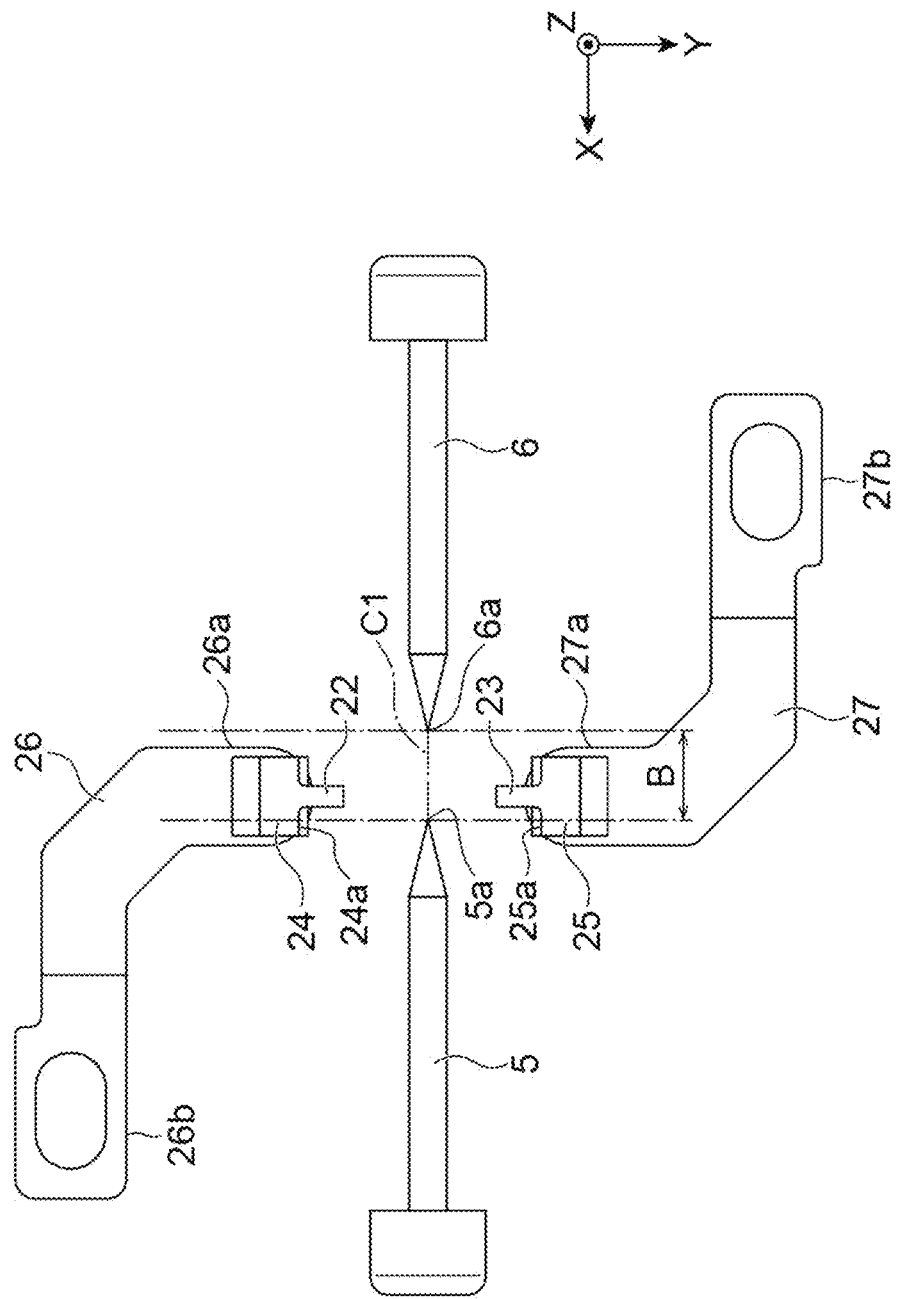
FIG. 7 is a plan view illustrating the pair of electrodes, the pair of conductive members, and the support member when viewed from above in a Z direction.
Figure 8:
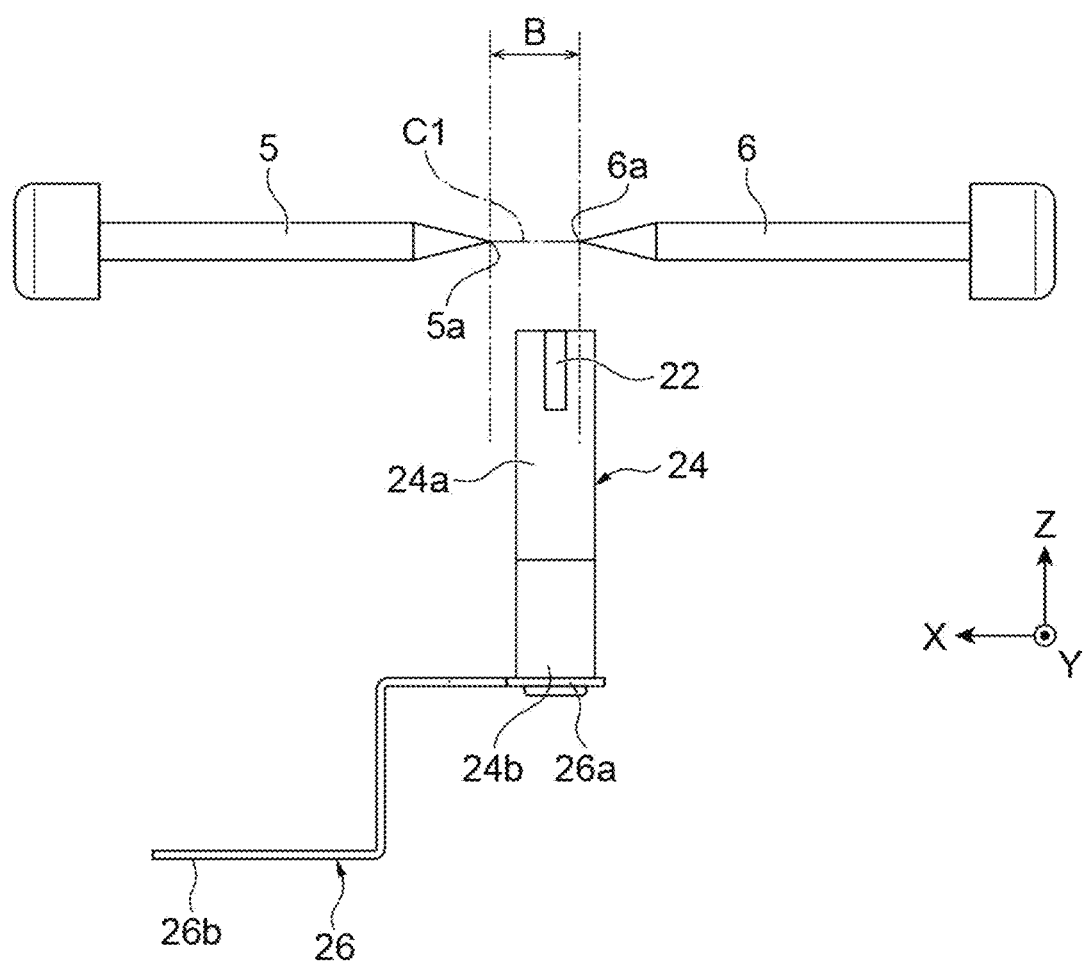
FIG. 8 is a side view illustrating the pair of electrodes, the pair of conductive members, and the support member when viewed in a Y direction.
Figure 9:
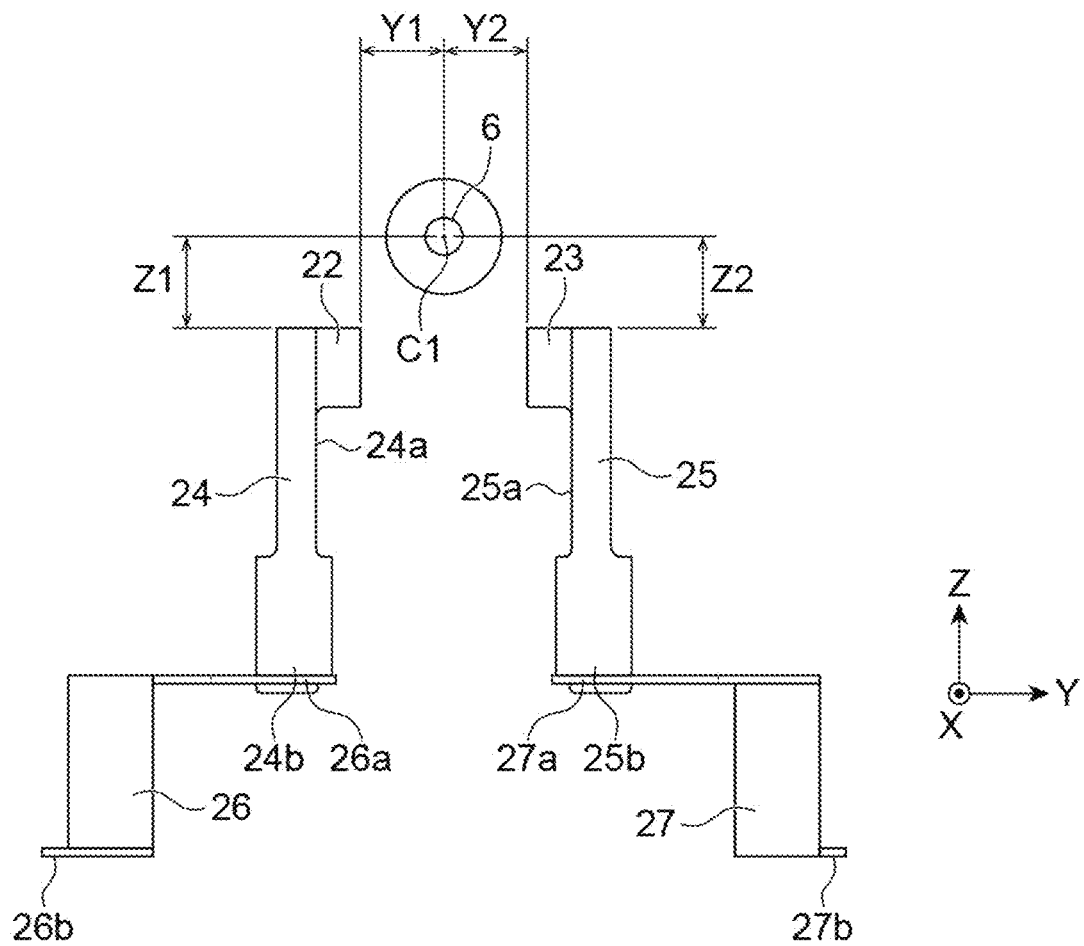
FIG. 9 is a side view illustrating the electrode, the pair of conductive members, and the support member when viewed in an X direction.

FIG. 6 to FIG. 9 are views showing the pair of electrodes 5 and 6, the pair of conductive members 22 and 23 and the support members 24 and 25 with the main body 21 that is removed. FIG. 6 is a perspective view, FIG. 7 is a plan view when viewed from above in the Z direction, FIG. 8 is a side view when viewed in the Y direction (where, the conductive member 23 and the support member 25 are omitted), and FIG. 9 is a side view when viewed in the X direction (where, the electrode 5 is omitted).

As shown in FIG. 6 to FIG. 9, the support members 24 and 25 have a columnar shape that extend in the direction (for example, Z direction) intersecting the direction (X direction) of the center line C1. The XY cross sections of the support members 24 and 25 have, for example, a rectangular shape. An inner surface 24a of the support member 24 and an inner surface 25a of the support member 25 face each other in the Y direction. That is, the positions of the support members 24 and 25 in the X direction coincide with each other. One end 26a of a wiring member 26 is fixed to a base end 24b of the support member 24. The wiring member 26 is, for example, a plate-like member made of a conductive material such as a metal, and is bent according to the shape of the accommodation portion and disposed below the support member 24. When the base end 24b of the support member 24 comes into contact with the one end 26a of the wiring member 26, the support member 24 and the wiring member 26 are electrically connected to each other with low resistance. Similarly, one end 27a of a wiring member 27 is fixed to a base end 25b of the support member 25. The wiring member 27 is, for example, is a plate-like member made of a conductive material such as a metal, and is bent according to the shape of the accommodation portion and disposed below the support member 25. When the base end 25b of the support member 25 comes into contact with the one end 27a of the wiring member 27, the support member 25 and the wiring member 27 are electrically connected to each other with low resistance.

The other ends 26b and 27b of the wiring members 26 and 27 are electrically connected to a wiring (not shown). This wiring has a potential between the potential of the electrode 5 and the potential of the electrode 6. Thus, the wiring members 26 and 27 function as a constant potential line having a potential between the potential of the electrode 5 and the potential of the electrode 6. This constant potential is, for example, an average potential of the potential of the electrode 5 and the potential of the electrode 6. In other words, when the potential of the electrode 5 is +A(V), and the potential of the electrode 6 is −A(V), the potential of the wiring members 26 and 27 is 0(V), that is, the ground potential.

The conductive members 22 and 23 are disposed in an area B (refer to FIG. 7 and FIG. 8) positioned between the distal end 5a of the electrode 5 and the distal end 6a of the electrode 6 in the X direction. The conductive members 22 and 23 have a plate shape in the X direction as a thickness direction. The thickness of the conductive members 22 and 23 in the X direction is, for example, in a range of 0.5 mm or more and 4.0 mm or less. The thickness of the conductive members 22 and 23 in the X direction is thinner than the width of the distal end part of the support members 24 and 25 in the same direction. The shape of the conductive members 22 and 23 when viewed in the X direction is, for example, a rectangular shape or a square shape. The conductive member 22 extends from the inner surface 24a at the distal end part of the support member 24 in the Y direction, and the conductive member 23 extends from the inner surface 25a at the distal end part of the support member 25 in the Y direction. The conductive members 22 and 23 can be formed by, for example, cutting a metal member common to the support members 24 and 25. That is, the conductive member 22 and the support member 24 are continuously formed as an integrated object, and the conductive member 23 and the support member 25 are continuously formed as an integrated object.

As shown in FIG. 7, the conductive members 22 and 23 are disposed to face each other in the Y direction. That is, the positions of the conductive members 22 and 23 in the X direction coincide with each other. When viewed in the Z direction, the conductive members 22 and 23 are disposed on both sides of the center line C1. The distances of the conductive members 22 and 23 from the center line C1 are equal to each other. In the present embodiment, as shown in FIG. 9, a distance Y1 from the conductive member 22 to the center line C1 in the Y direction and a distance Y2 from the conductive member 23 to the center line C1 in the Y direction are equal to each other, and a distance Z1 from the conductive member 22 to the center line C1 in the Z direction and a distance Z2 from the conductive member 23 to the center line C1 in the Z direction are equal to each other. When viewed in the Y direction, the conductive members 22 and 23 are positioned below the center line C1 in the Z direction. As shown in FIG. 4, since the plurality of pairs of optical fibers 3 are positioned above the center line C1 in the Z direction, the center line C1 in the Z direction is positioned between the conductive members 22 and 23 and the plurality of pairs of optical fibers 3.

Figure 10:
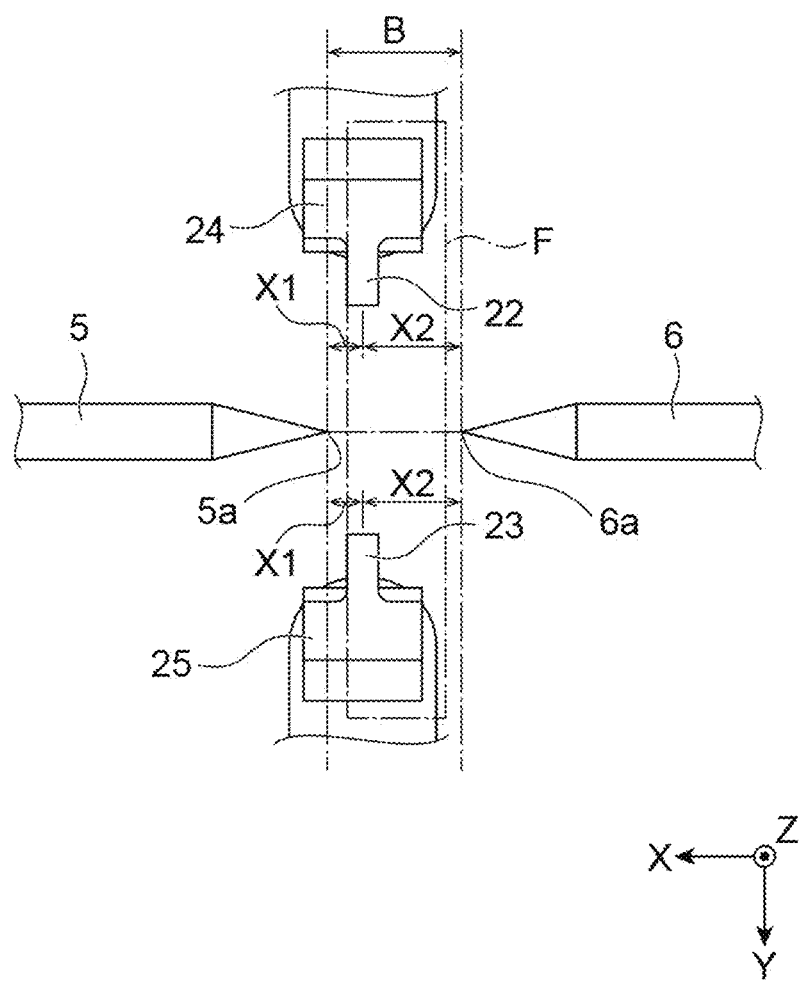
FIG. 10 is a plan view illustrating an enlarged part in FIG. 7.

FIG. 10 is a plan view showing an enlarged part in FIG. 7. As shown in FIG. 10, the conductive members 22 and 23 are positioned closer to the high-potential electrode 5 in the area B between the electrodes 5 and 6. The fact that the conductive members 22 and 23 are positioned closer to the electrode 5 means that a distance X1 between the center of the conductive members 22 and 23 and the distal end 5a of the electrode 5 in the X direction is smaller than a distance X2 between the center of the conductive members 22 and 23 and the distal end 6a of the electrode 6. In other words, in the X direction, the conductive members 22 and 23 are disposed at a position at which the shortest distance between the distal end 6a of the electrode 6 and the conductive members 22 and 23 is shorter than the shortest distance between the distal end 5a of the electrode 5 and the conductive members 22 and 23. In FIG. 10, an area F occupied by the plurality of pairs of optical fibers 3 is shown. In the present embodiment, when viewed in the Z direction, the area F and the conductive members 22 and 23 overlap. In an example, when viewed in the Z direction, the conductive members 22 and 23 are included in the area F. The area F corresponds to the plurality of grooves 16a and 17a in which the plurality of pairs of optical fibers 3 are accommodated. That is, in the present embodiment, when viewed in the Z direction, the plurality of grooves 16a and 17a and the conductive members 22 and 23 at least partially overlap.

A method for fusion-splicing of the present embodiment using the fusion splicer 1 having the above configuration is as follows. First, optical fibers 3 to be spliced are disposed and accommodated in the grooves 16a of the pedestal 11 of the fusion splicer 1. The other optical fibers 3 to be spliced are disposed and accommodated in the grooves 17a of the pedestal 11. Next, the ends of the optical fibers 3 accommodated in the grooves 16a and the ends of the optical fibers 3 accommodated in the grooves 17a are abutted against each other in the opening 11a. Then, the potential of the conductive members 22 and 23 via the support members 24 and 25 is set to a potential between the electrodes 5 and 6, that is, a potential that is lower than the potential of the electrode 5 and higher than the potential of the electrode 6, and an arc discharge is performed by the electrodes 5 and 6 on a part in which the ends of the optical fibers 3 are abutted against each other. Thereby, the plurality of paired optical fibers 3 are melted and fusion-spliced to each other.

The effects obtained by the fusion splicer 1 and the method for fusion-splicing according to the present embodiment described above will be described. In the present embodiment, the conductive members 22 and 23 having a potential between the potential of the electrode 5 and the potential of the electrode 6 are provided apart from the plurality of pairs of optical fibers 3 in the area B between the electrodes 5 and 6 in the X direction along the center line C1 connecting the distal ends of the electrodes 5 and 6. In this case, an arc (electric arc) of the arc discharge generated between the electrodes 5 and 6 is attracted to the conductive members 22 and 23. Therefore, the shape of the arc can be adjusted, and thus the molten state of the optical fibers 3 can be made substantially uniform. According to the present embodiment, it is possible to reduce the variation in the molten state according to the arrangement direction position of the multi-fiber optical fiber cables, and thus it is possible to reduce the variation in the fused state.

As in the present embodiment, the pair of conductive members 22 and 23 are disposed side by side in the axial direction (Y direction) of the plurality of pairs of optical fibers 3, and the distances of the pair of conductive members 22 and 23 from the center line C1 may be equal to each other. In this case, the shape of the arc can be adjusted more appropriately and the molten state of the optical fibers 3 can be made more uniform.

As in the present embodiment, the potential of the conductive members 22 and 23 may be an average potential of the potentials of the electrodes 5 and 6. In this case, the shape of the arc can be adjusted more appropriately and the molten state of the optical fibers 3 can be made more uniform.

As in the present embodiment, when viewed in the Z direction, the area F occupied by the plurality of pairs of optical fibers 3 and the conductive members 22 and 23 may overlap. In this case, the shape of the arc can be adjusted more appropriately and the molten state of the optical fibers 3 can be made more uniform.

As in the present embodiment, the fusion splicer 1 includes the conductive and columnar support members 24 and 25 that extend in the direction intersecting the X direction and support the conductive members 22 and 23. The conductive members 22 and 23 have a plate shape in the X direction as a thickness direction, and extend from the distal end parts of the support members 24 and 25, and the base ends 24b and 25b of the support members 24 and 25 may be electrically connected to constant potential lines (the wiring members 26 and 27). In this manner, when the conductive members 22 and 23 have a plate shape in the X direction as a thickness direction, the shape of the arc can be adjusted more appropriately and the molten state of the optical fibers 3 can be made more uniform. For example, when the above support members 24 and 25 are provided, only the plate-like conductive members 22 and 23 can be made closer to the arc.

First Example

Figure 11:
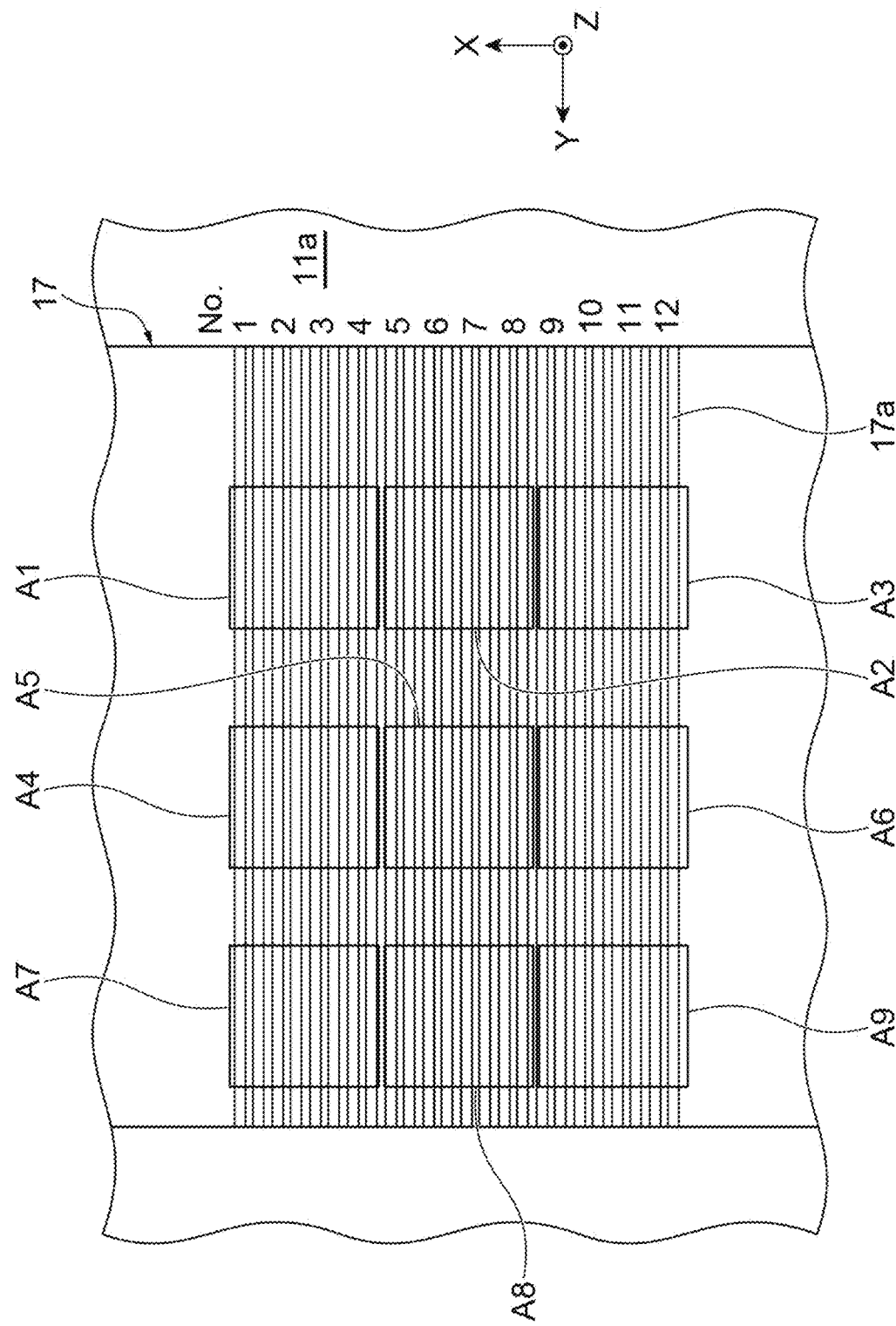
FIG. 11 is a plan view illustrating disposition of a conductive member in a first example.

The inventors observed the molten state of the plurality of pairs of optical fibers 3 by variously changing the relative positions between the conductive members 22 and 23 and the center line C1. FIG. 11 is a plan view showing disposition of the conductive member 23 in this experiment. Disposition of the conductive member 22 was symmetrical to that of the conductive member 23 with respect to the center line C1. In FIG. 11, the pedestal 11 when viewed in the Z direction is shown, and also the contour line of the conductive member 23 is indicated by a solid line. In this experiment, the planar shapes of the conductive members 22 and 23 were a square of 1 mm square. In the drawing, the numbers No. 1 to No. 12) assigned to 12 grooves 17a are shown. These numbers were assigned in order from the groove 17a on the high potential side.

In this experiment, the positions of the conductive members 22 and 23 were set as 9 positions of A1 to A9 as shown in the drawing. Positions A1 to A3 were located closer to one end on the side of the center line C1 in the pedestal 11, and the distance from the center line C1 to the positions A1 to A3 in the Y direction was 4.0 mm. Positions A4 to A6 were located substantially at the center in the pedestal 11, and the distance from the center line C1 to the positions A4 to A6 in the Y direction was 5.5 mm. Positions A7 to A9 were located closer to the other end on the side opposite to the center line C1 in the pedestal 11, and the distance from the center line C1 to the positions A7 to A9 in the Y direction was 7.7 mm. The positions A1, A4 and A7 were located on the high potential side of the fiber disposition area, and overlapped the grooves 16a and 17a of No. 1 to No. 4. The positions A2, A5 and A8 were located at the center of the fiber disposition area and overlapped the grooves 16a and 17a of No. 5 to No. 8. The positions A3, A6 and A9 were located on the low potential side of the fiber disposition area and overlapped the grooves 16a and 17a of No. 9 to No. 12. The intermediate position between the distal end 5a of the electrode 5 and the distal end 6a of the electrode 6 in the X direction was aligned with the boundary position between No. 6 and No. 7. In the X direction, the positions A1, A4 and A7 were located closer to the electrode 5 on the high potential side, the positions A3, A6 and A9 were located closer to the electrode 6 on the low potential side, and the positions A2, A5 and A8 were located between the electrode 5 and the electrode 6.

Figure 12:
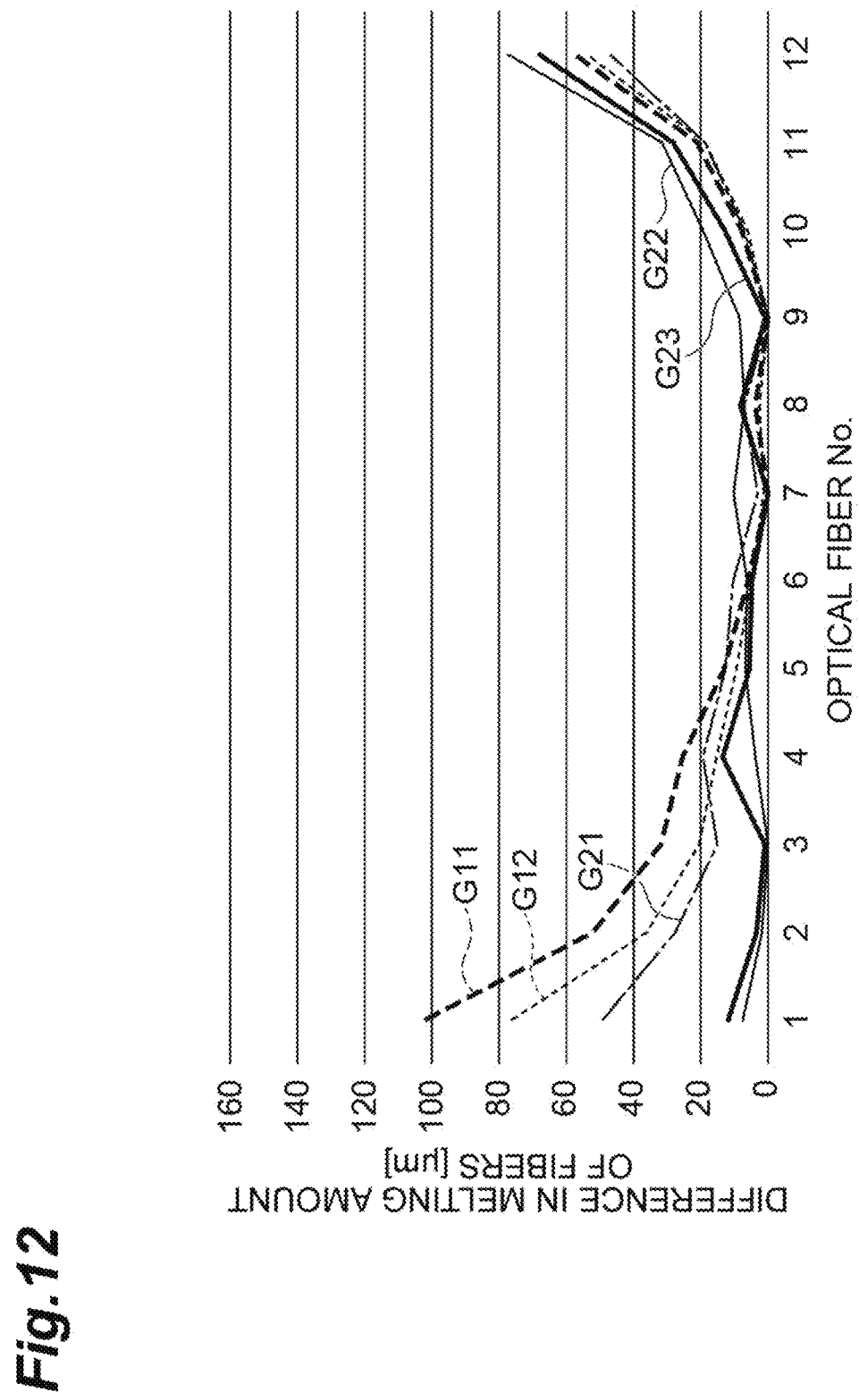
FIG. 12 is a graph illustrating the relationship between the optical fiber number and the difference in the melting amount of optical fibers at positions A1 to A3.
Figure 13:
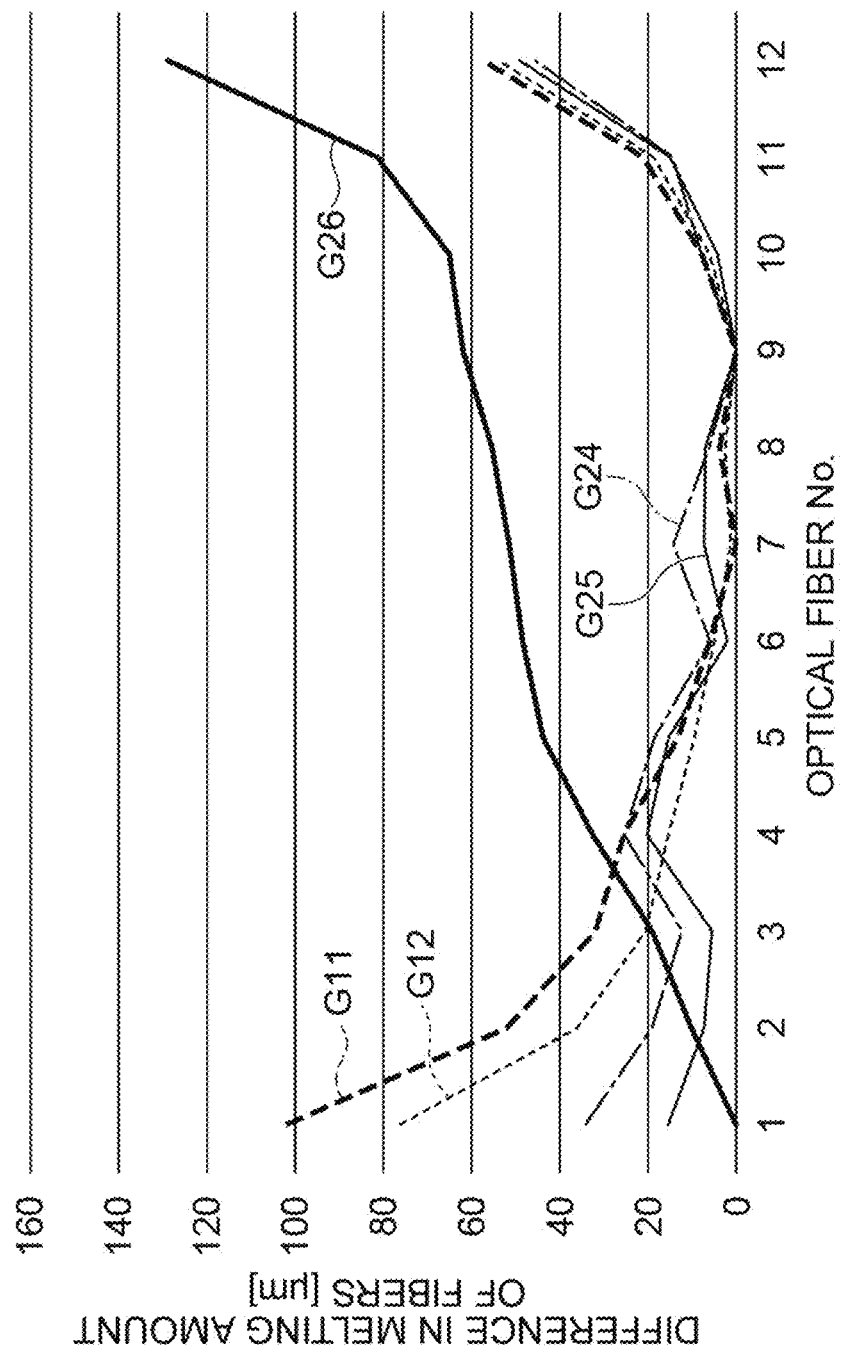
FIG. 13 is a graph illustrating the relationship between the optical fiber number and the difference in the melting amount of optical fibers at positions A4 to A6.
Figure 14:
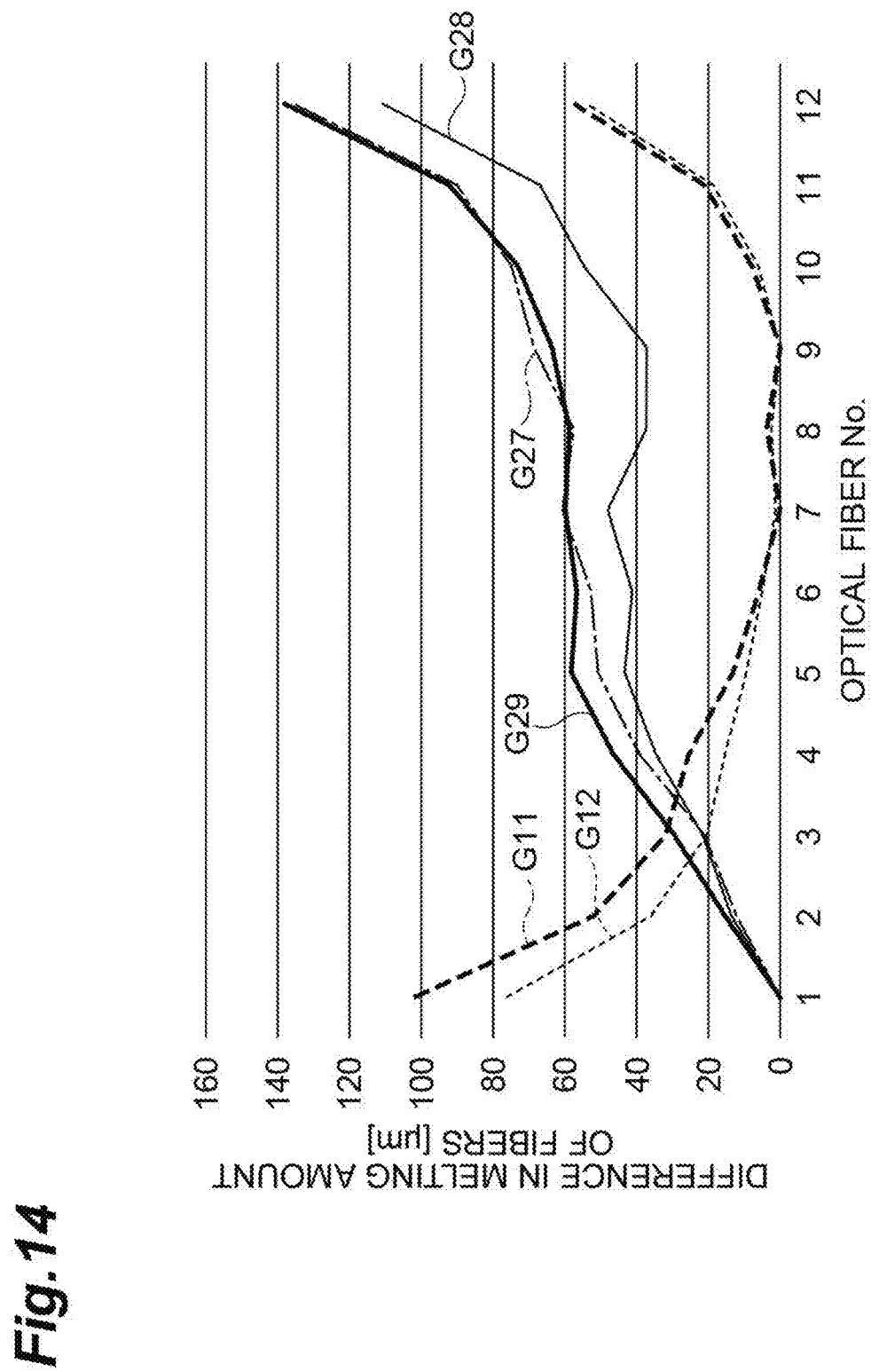
FIG. 14 is a graph illustrating the relationship between the optical fiber number and the difference in the melting amount of optical fibers at positions A7 to A9.

FIG. 12 to FIG. 14 are graphs showing the relationship between the optical fiber number and the difference in the melting amount of optical fibers (unit·μm) at the positions A1 to A9. Graphs G21 to G23 shown in FIG. 12 show the difference in the melting amount at the positions A1 to A3. Graphs G24 to G26 shown in FIG. 13 show the difference in the melting amount at the positions A4 to A6. Graphs G27 to G29 shown in FIG. 14 show the difference in the melting amount at the positions A7 to A9. In FIG. 12 to FIG. 14, as a comparative example, the upper limit average (graph G11) and the lower limit average (graph G12) in difference in the melting amount of fibers when the conductive members 22 and 23 were not provided are also shown. The optical fiber number corresponds to the number of the groove 17a shown in FIG. 11. The "inciting amount" indicates how much the position of the end surface of the optical fiber changed before and after discharging was performed. As the optical fibers melt due to heating with an arc discharge, some of the optical fibers evaporate, and the end surfaces of the optical fibers appear to move in the Y direction. The amount of movement of the end surface of the optical fiber from the initial position in the Y direction in this case is defined as the "melting amount," The "difference in the melting amount" is a difference between the maximum melting amount of the optical fibers of No. 1 to No. 12 and the minimum melting amount of the optical fibers of No. 1 to No. 12. The following Table 1 shows the maximum difference in the melting amount corresponding to graphs G11, G12 and G21 to G29 (difference between the maximum melting amount and the minimum melting amount of No. 1 to No. 12).

TABLE 1

| Condition | Maximum difference in melting amount (μm) |
|---|---|
| Upper limit average (G11) | 102 |
| Lower limit average (G12) | 76 |
| Position A1 (G21) | 49 |
| Position A2 (G22) | 77 |
| Position A3 (G23) | 68 |
| Position A4 (G24) | 46 |
| Position A5 (G25) | 49 |
| Position A6 (G26) | 129 |
| Position A7 (G27) | 136 |
| Position A8 (G28) | 111 |
| Position A9 (G29) | 138 |

With reference to FIG. 12 to FIG. 14 and Table 1, it can be understood that, when the conductive members 22 and 23 were provided (graphs G21 to G29), the melting amount of fibers was almost uniform over No. 1 to No. 12 compared to when the conductive members 22 and 23 were not provided (graphs G11 and G12). In particular, at the positions A1, A4 and A5 (graphs G21, G24 and G25), the difference in the melting amount was less than 50 μm, and the melting amount of fibers was remarkably uniform over No. 1 to No. 12. That is, when the conductive members 22 and 23 were positioned closer to the electrode 5 on the high potential side, the melting amount of fibers was more effectively uniform compared to when the conductive members 22 and 23 were positioned closer to the electrode 6 on the low potential side. Accordingly, as in the above embodiment, when the conductive members 22 and 23 were positioned closer to the electrode 5 on the high potential side, the shape of the arc could be more effectively adjusted and the molten state of the optical fibers 3 could be made more uniform. According to the above embodiment, it was possible to effectively reduce the variation in the fused state according to the arrangement direction position of the multi-fiber optical fiber cable.

Second Example

Figure 15:
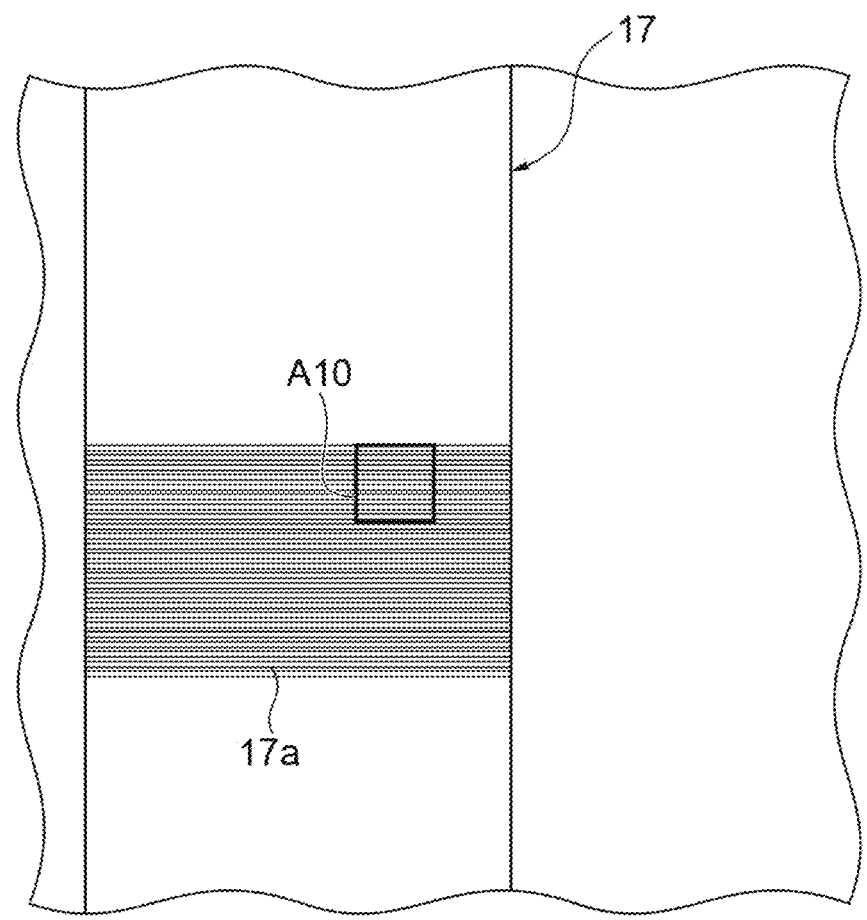
FIG. 15 is a plan view illustrating disposition of a conductive member in a second example.
Figure 16:
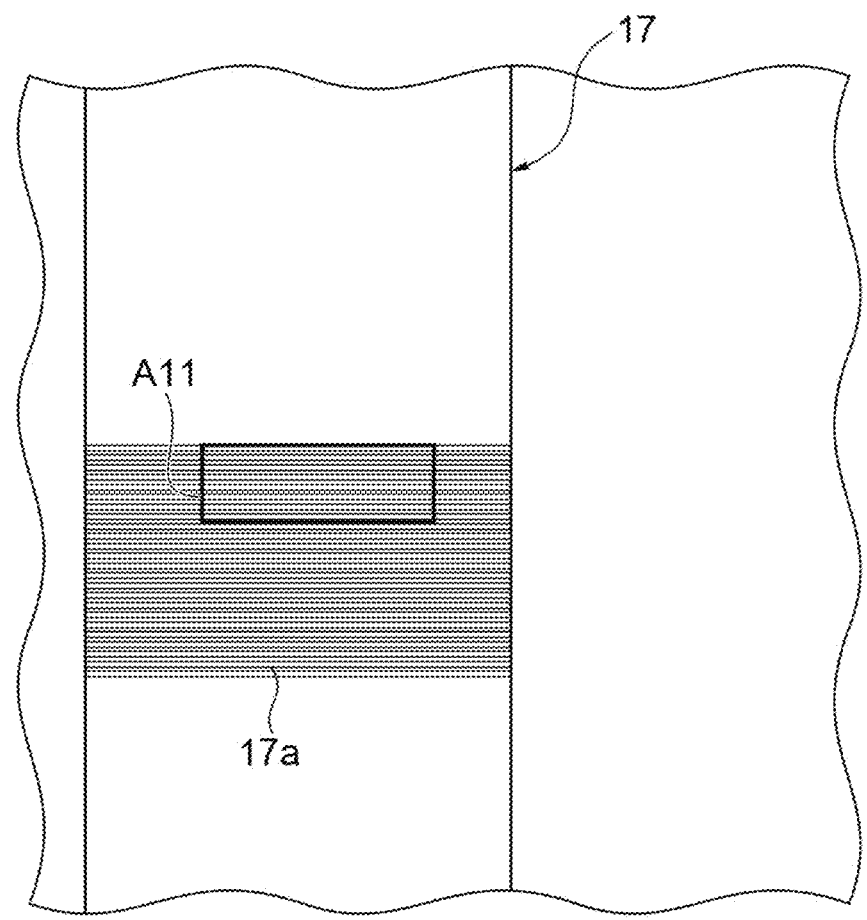
FIG. 16 is a plan view illustrating disposition of a conductive member in the second example.
Figure 17:
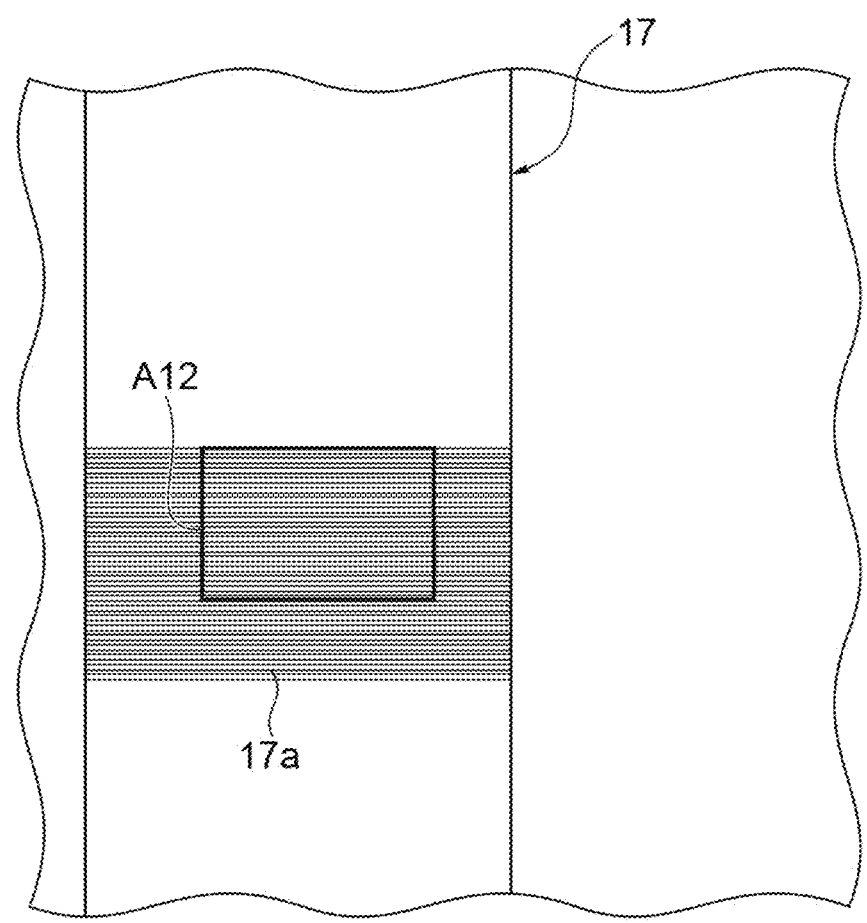
FIG. 17 is a plan view illustrating disposition of a conductive member in the second example.

The inventors observed the fusion-spliced state of the plurality of pairs of optical fibers 3 by variously changing the plane area of the conductive members 22 and 23 (the area in contact with the pedestal 11). FIG. 15 to FIG. 17 are plan views showing disposition of the conductive member 23 in this experiment. The position and shape of the conductive member 22 were symmetrical to those of the conductive member 23 with respect to the center line C1. In FIG. 15 to FIG. 17, the pedestal 11 when viewed in the Z direction is shown and also the contour line of the conductive member 23 is indicated by a solid line. In this experiment, the planar shapes of the conductive members 22 and 23 were a square of 1 mm square (shape A10 in FIG. 15), a 1 mm×3 mm rectangle (shape A11 in FIG. 16), and a 2 mm×3 mm rectangle (shape A12 in FIG. 17). However, the distance between one end of the conductive members 22 and 23 on the side of the center line C1 in the direction Y and the center line C1 was the same (4.0 mm). In addition, it was assumed that the shapes A10 and A11 overlapped the grooves 16a and 17a of No. 1 to No. 4, and the shape A12 overlapped the grooves 16a and 17a of No. 1 to No. 8.

Figure 18:
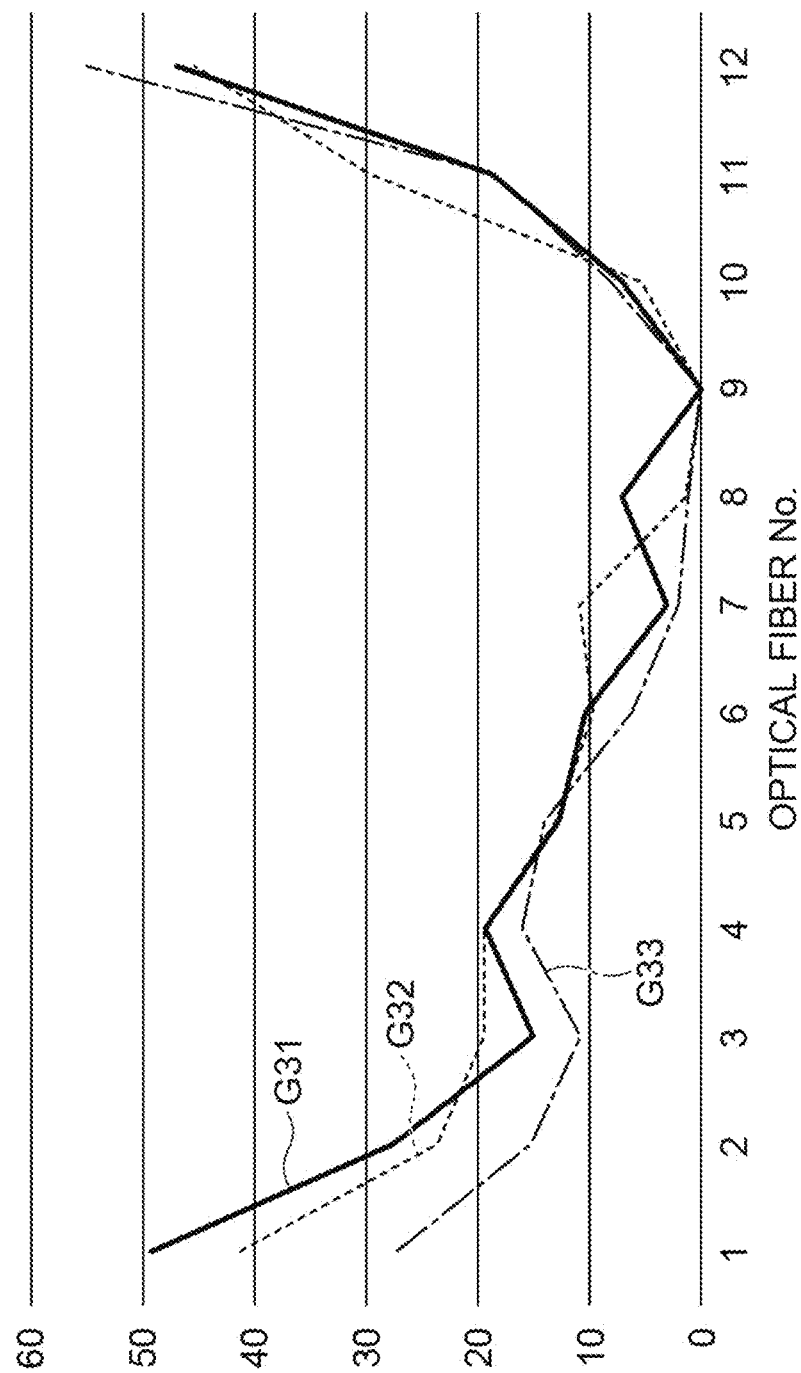
FIG. 18 is a graph illustrating the relationship between the optical fiber number and the difference in the melting amount of optical fibers corresponding to FIG. 15 to FIG. 17.

FIG. 18 is a graph showing the relationship between the optical fiber number and the difference in the melting amount of optical fibers (unit·μm) corresponding to FIG. 15 to FIG. 17. The graph G31 shows the difference in the melting amount corresponding to the shape A10 in FIG. 15. The graph G32 shows the difference in the melting amount corresponding to the shape A11 in FIG. 16. The graph G33 shows the difference in the melting amount corresponding to the shape A12 in FIG. 17. The following Table 2 shows the maximum difference in the melting amount corresponding to the graphs G31 to G33. With reference to the graphs G31 to G33 and Table 2, it can be understood that there was no significant difference in the uniformity of the melting amount of the fibers depending on the plane area of the conductive members 22 and 23. In consideration together with the first example, it can be said that the position was more important than the plane area of the conductive members 22 and 23 in making the melting amount of fibers uniform.

TABLE 2

| Condition | Maximum difference in melting amount (μm) |
|---|---|
| 1 mm × 1 mm (G31) | 49 |
| 1 mm × 3 mm (G32) | 45 |
| 2 mm × 3 mm (G33) | 55 |

Third Example

Figure 19:
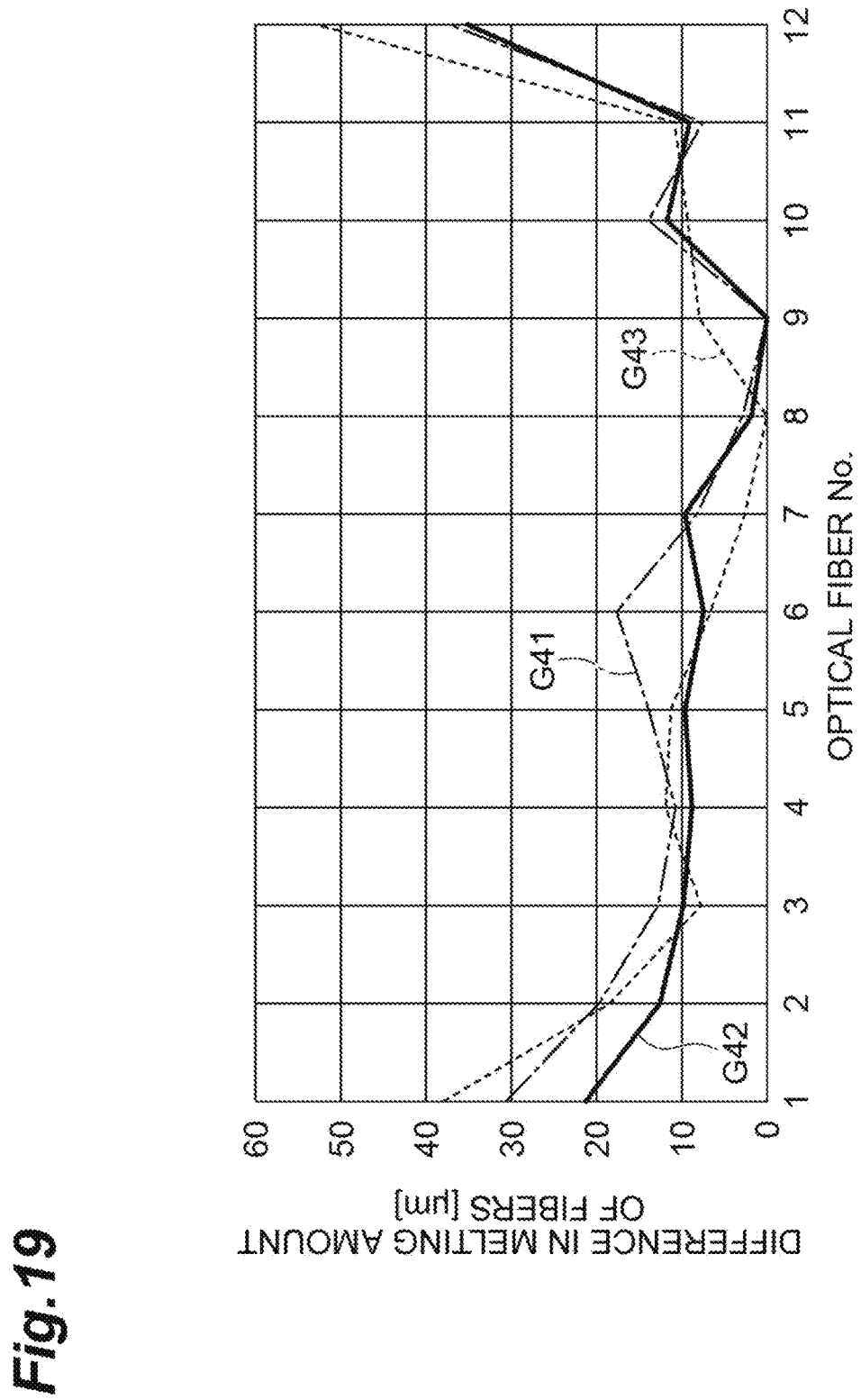
FIG. 19 is a graph illustrating the relationship between the optical fiber number and the difference in the inciting amount of optical fibers corresponding to each thickness.

The inventors Observed the molten state of the plurality of pairs of optical fibers 3 when the thicknesses of the conductive members 22 and 23 in the Z direction were 1 mm and 4 mm. FIG. 19 is a graph showing the relationship between the optical fiber number and the difference in the melting amount of optical fibers (unit·μm) corresponding to each thickness. The graph G41 shows the difference in the melting amount when the thickness was 1 mm. The graph G42 shows the difference in the melting amount when the thickness was 4 mm. The graph G43 shows the difference in the melting amount when the conductive members 22 and 23 were not provided as a comparative example. The following Table 3 shows the maximum difference in the melting amount corresponding to the graphs G41 to G43. With reference to the graphs G41 to G43 and Table 3, it can be said that there was no large difference in the uniformity of the melting amount of fibers depending on the thickness of the conductive members 22 and 23, and if the thickness of the conductive members 22 and 23 is within the range of this experiment, the melting amount of fibers could be made uniform effectively. In consideration together with the first example, it can be said that the position was more important than the thickness of the conductive members 22 and 23 in making the melting amount of fibers uniform more effectively.

TABLE 3

| Condition | Maximum difference in melting amount (μm) |
|---|---|
| Thickness 1 mm (G41) | 37 |
| Thickness 4 mm (G42) | 35 |
| Without conductive member (G43) | 53 |

Fourth Example

The inventors observed the fusion-spliced state of the plurality of pairs of optical fibers 3 when the position of the conductive members 22 and 23 in the Z direction was set to the reference position, the reference position+0.2 mm, the reference position−0.3 mm, and the reference position−0.5 mm. The distance between the conductive members 22 and 23 and the center line C1 in the Z direction at the reference position was 4.8 mm, and the distance between the conductive members 22 and 23 and the optical fibers 3 in the Z direction at the reference position was 5.3 mm.

Figure 20:
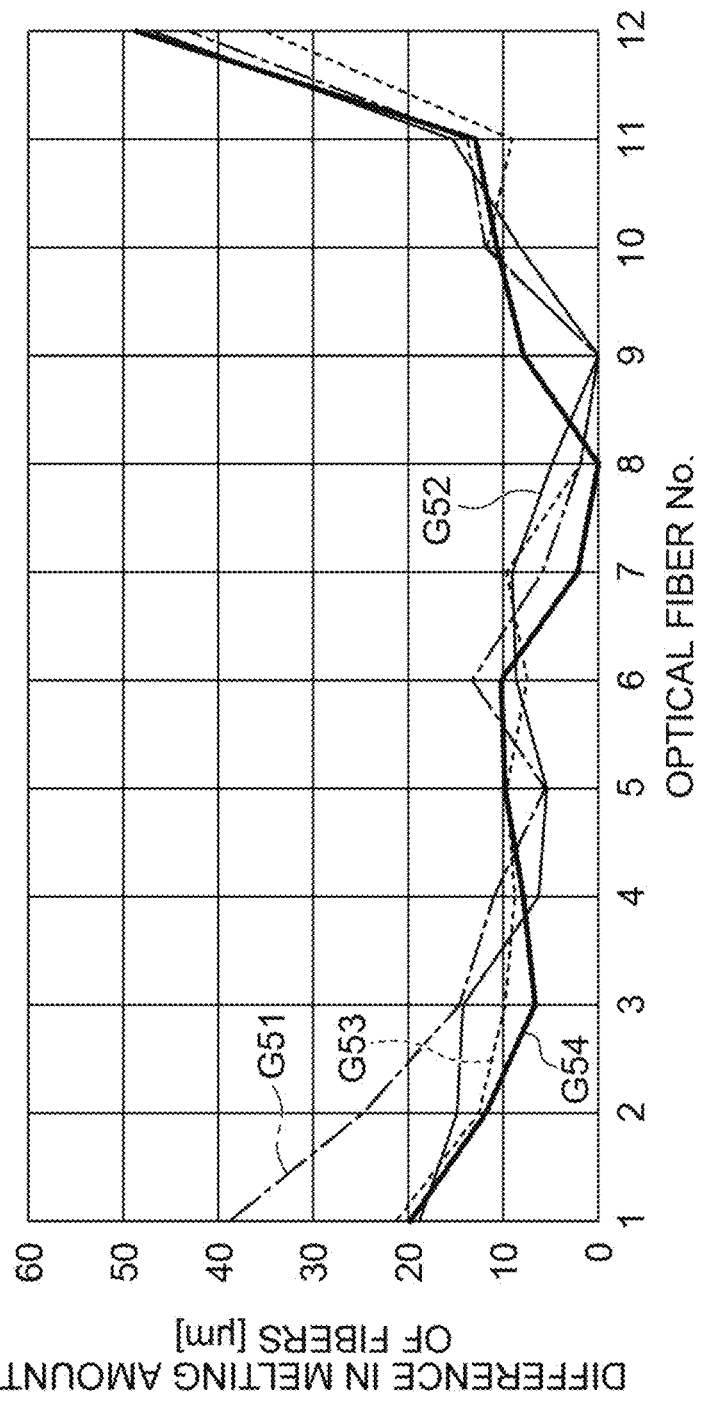
FIG. 20 is a graph illustrating the relationship between the optical fiber number and the difference in the melting amount of optical fibers corresponding to each position in the Z direction.

FIG. 20 is a graph showing the relationship between the optical fiber number and the difference in the melting amount of optical fibers (unit·μm) corresponding to each position in the Z direction. The graph G51 shows the difference in the melting amount corresponding to the reference position−0.5 mm. The graph G52 shows the difference in the melting amount corresponding to the reference position−0.3 mm. The graph G53 shows the difference in the melting amount corresponding to the reference position. The graph G54 shows the difference in the melting amount corresponding to the reference position+0.2 mm. The following Table 4 shows the maximum difference in the melting amount corresponding to the graphs G51 to G54. With reference to the graphs G51 to G54 and Table 4, it can be said that a particularly significant effect appeared at the reference position, but if the position of the conductive members 22 and 23 in the Z direction was within the range of this experiment, the melting amount of fibers could be made uniform effectively.

TABLE 4

| Condition | Maximum difference in melting amount (μm) |
|---|---|
| Reference position − 0.5 mm (G51) | 43 |
| Reference position − 0.3 mm (G52) | 47 |
| Reference position (G53) | 35 |
| Reference position + 0.2 mm (G54) | 49 |

The fusion splicer and the method of fusion-splicing according to the present invention are not limited to the above embodiments and various other modifications are possible. For example, in the above embodiment, the fusion splicer 1 includes the pair of conductive members 22 and 23, but the number of conductive members is arbitrary and may be one or three or more. In addition, in the above embodiment, the configuration in which 12 optical fibers 3 are collectively fusion-spliced has been exemplified, but the number of optical fibers that are collectively fusion-spliced is arbitrary.

REFERENCE SIGNS LIST

1 Fusion splicer
1A Fusion splicing unit
3 Optical fiber
5, 6 Electrode
5a, 6a Distal end
11 Pedestal
11a Opening
13 Electrode disposition unit
13a, 13b Contact surface
15 Optical fiber disposition unit
16 First disposition unit
16a Groove
17 Second disposition unit
17a Groove
20 Support
21 Main body
21a Mounting surface
21b Opening
21c, 21d Holding hole
22, 23 Conductive member
24, 25 Support member
24a, 25a Inner surface
25b Base end
26, 27 Wiring member
26a, 27a One end
26b, 27b Other end
32 Housing
34 Heater
35 Monitor
36 Windshield cover 37 Power switch
38 Connection start switch
A1 to A9 Position
A10 to A12 Shape
B, F Area
C1 Center line

The invention claimed is:

1. A fusion splicer for fusion-splicing end surfaces of a plurality of first optical fibers and end surfaces of a plurality of second optical fibers by melting with an arc discharge, comprising:
a first electrode and a second electrode each having a distal end that are disposed so that the distal ends face each other on a center line that extends in a first direction, wherein the first electrode has a first potential and the second electrode has a second potential lower than the first potential, and the first electrode and the second electrode are configured to generate an arc discharge between the distal ends;
an optical fiber disposition unit which has a plurality of grooves in which the plurality of first optical fibers and the plurality of second optical fibers are able to be accommodated and which extend in a second direction intersecting the first direction, the optical fiber disposition unit being disposed between the first electrode and the second electrode in the first direction;
a first conductive member that is provided apart from the plurality of grooves between the first electrode and the second electrode in the first direction, wherein the first conductive member has a third potential that is lower than the first potential and higher than the second potential, and is disposed at a position at which the shortest distance from one of the first electrode and the second electrode is shorter than the shortest distance from the other of the first electrode and the second electrode in the first direction; and
a conductive and columnar first support member that extends in a third direction intersecting both the first direction and the second direction and supports the first conductive member,
wherein the first conductive member has a plate shape in the first direction as a thickness direction and extends from a distal end part of the first support member, and
wherein a base end of the first support member is electrically connected to a constant potential line having the third potential.

2. The fusion splicer according to claim 1, wherein the first conductive member is disposed at a position at which the shortest distance from the first electrode is shorter than the shortest distance from the second electrode in the first direction.

3. The fusion splicer according to claim 1, wherein the third potential is an average potential of the first potential and the second potential.

4. The fusion splicer according to claim 1, wherein the plurality of grooves and the first conductive member at least partially overlap each other when viewed in a third direction orthogonal to both the first direction and the second direction.

5. The fusion splicer according to claim 1, wherein the thickness of the first conductive member in the first direction is thinner than the thickness of the first support member in the first direction.

6. The fusion splicer according to claim 1, wherein the thickness of the first conductive member is 0.5 mm or more and 4.0 mm or less.

7. The fusion splicer according to claim 1, wherein the first conductive member and the first support member are continuously formed as an integrated object.

8. The fusion splicer according to claim 1, further comprising a main body that mounts the first electrode and the second electrode, and the optical fiber disposition unit thereon,
wherein a first holding hole positioned between the first electrode and the second electrode in the first direction is provided in the main body, and at least a part of the first conductive member and the first support member is inserted into and held in the first holding hole.

9. The fusion splicer according to claim 1, further comprising a second conductive member that is provided apart from the plurality of grooves between the first electrode and the second electrode in the first direction,
wherein the second conductive member has a third potential that is lower than the first potential and higher than the second potential, and is disposed at a position at which the shortest distance from one of the first electrode and the second electrode is shorter than the shortest distance from the other of the first electrode and the second electrode in the first direction.

10. The fusion splicer according to claim 9, wherein the first conductive member and the second conductive member are disposed to face each other in a second direction intersecting the first direction, and a distance between the first conductive member and the center line and a distance between the second conductive member and the center line are equal to each other.

11. The fusion splicer according to claim 9, further comprising a conductive and columnar second support member that extends in a third direction intersecting both the first direction and the second direction and supports the second conductive member,
wherein the second conductive member has a plate shape in the first direction as a thickness direction and extends from a distal end part of the second support member, and
wherein a base end of the second support member is electrically connected to a constant potential line having the third potential.

12. A method for fusion-splicing end surfaces of a plurality of first optical fibers and end surfaces of a plurality of second optical fibers using the fusion splicer according to claim 1, the method comprising:
disposing the plurality of first optical fibers in the plurality of grooves corresponding to the plurality of first optical fibers;
disposing the plurality of second optical fibers in the plurality of grooves corresponding to the plurality of second optical fibers;
facing the end surfaces of the plurality of first optical fibers and the end surfaces of the plurality of second optical fibers each other in an area between the distal end of the first electrode and the distal end of the second electrode; and
generating an arc discharge between the first electrode and the second electrode to fusion-splice the end surfaces of the plurality of first optical fibers and the end surfaces of the plurality of second optical fibers by melting,
wherein the third potential that is lower than the first potential and higher than the second potential is supplied to at least one of the first conductive member and the second conductive member in the fusing-splicing.

13. The method for fusion-splicing according to claim 12, wherein at least one of the disposing of the plurality of first optical fibers and the disposing of the plurality of second optical fibers, and the facing are performed at the same time.

14. A fusion splicer for fusion-splicing end surfaces of a plurality of first optical fibers and end surfaces of a plurality of second optical fibers by melting with an arc discharge, comprising:
  a first electrode and a second electrode each having a distal end that are disposed so that the distal ends face each other on a center line that extends in a first direction, wherein the first electrode has a first potential and the second electrode has a second potential lower than the first potential, and the first electrode and the second electrode are configured to generate an arc discharge between the distal ends;
  an optical fiber disposition unit which has a plurality of grooves in which the plurality of first optical fibers and the plurality of second optical fibers are able to be accommodated and which extend in a second direction intersecting the first direction, the optical fiber disposition unit being disposed between the first electrode and the second electrode in the first direction;
  a first conductive member that is provided apart from the plurality of grooves between the first electrode and the second electrode in the first direction, wherein the first conductive member has a third potential that is lower than the first potential and higher than the second potential, and is disposed at a position at which the shortest distance from one of the first electrode and the second electrode is shorter than the shortest distance from the other of the first electrode and the second electrode in the first direction; and
  a second conductive member that is provided apart from the plurality of grooves between the first electrode and the second electrode in the first direction, wherein the second conductive member has a third potential that is lower than the first potential and higher than the second potential, and is disposed at a position at which the shortest distance from one of the first electrode and the second electrode is shorter than the shortest distance from the other of the first electrode and the second electrode in the first direction.

15. The fusion splicer according to claim 14, wherein the first conductive member is disposed at a position at which the shortest distance from the first electrode is shorter than the shortest distance from the second electrode in the first direction.

16. The fusion splicer according to claim 14, wherein the third potential is an average potential of the first potential and the second potential.

17. The fusion splicer according to claim 14, wherein the plurality of grooves and the first conductive member at least partially overlap each other when viewed in a third direction orthogonal to both the first direction and the second direction.

18. The fusion splicer according to claim 14, wherein the first conductive member and the second conductive member are disposed to face each other in a second direction intersecting the first direction, and a distance between the first conductive member and the center line and a distance between the second conductive member and the center line are equal to each other.

19. The fusion splicer according to claim 14, further comprising a conductive and columnar second support member that extends in a third direction intersecting both the first direction and the second direction and supports the second conductive member,
  wherein the second conductive member has a plate shape in the first direction as a thickness direction and extends from a distal end part of the second support member, and
  wherein a base end of the second support member is electrically connected to a constant potential line having the third potential.

20. The fusion splicer according to claim 14, further comprising a conductive and columnar first support member that extends in a third direction intersecting both the first direction and the second direction and supports the first conductive member,
  wherein a thickness of the first conductive member in the first direction is thinner than a thickness of the first support member in the first direction.

* * * * *